(12) United States Patent
Sakaguchi et al.

(10) Patent No.: US 11,325,200 B2
(45) Date of Patent: May 10, 2022

(54) WIRE FEEDING SYSTEM AND WELDING SYSTEM

(71) Applicant: DAIHEN Corporation, Osaka (JP)

(72) Inventors: Yoshinori Sakaguchi, Osaka (JP); Hideki Shimogiku, Osaka (JP); Koichi Miyabe, Osaka (JP)

(73) Assignee: DAIHEN Corporation, Osaka (JP)

( * ) Notice: Subject to any disclaimer, the term of this patent is extended or adjusted under 35 U.S.C. 154(b) by 380 days.

(21) Appl. No.: 16/373,822

(22) Filed: Apr. 3, 2019

(65) Prior Publication Data

US 2019/0314921 A1    Oct. 17, 2019

(30) Foreign Application Priority Data

Apr. 12, 2018    (JP) .............................. JP2018-076913

(51) Int. Cl.
*B23K 9/12*    (2006.01)
*B23K 9/133*    (2006.01)
*B23K 9/28*    (2006.01)

(52) U.S. Cl.
CPC ............ *B23K 9/125* (2013.01); *B23K 9/1333* (2013.01); *B23K 9/1336* (2013.01); *B23K 9/287* (2013.01)

(58) Field of Classification Search
CPC ...... B23K 9/125; B23K 9/133; B23K 9/1333; B23K 9/1336; B23K 9/287
See application file for complete search history.

(56) References Cited

U.S. PATENT DOCUMENTS

| 2,867,743 | A | * | 1/1959 | Needham | ............. | B23K 9/0731 |
| | | | | | | 314/75 |
| 3,586,221 | A | * | 6/1971 | Rosen | .................... | B23K 9/125 |
| | | | | | | 226/1 |
| 3,602,687 | A | * | 8/1971 | Pollock | ................ | B23K 9/0956 |
| | | | | | | 219/137.7 |
| 6,831,251 | B1 | * | 12/2004 | Artelsmair | ........... | B23K 9/1336 |
| | | | | | | 219/137.71 |

FOREIGN PATENT DOCUMENTS

| CN | 102035294 A | 4/2011 |
| JP | 2006-907 A | 1/2006 |
| JP | 3770664 B2 | 4/2006 |
| RU | 2 063 315 C1 | 7/1996 |

OTHER PUBLICATIONS

European Search Report received in the corresponding European Patent application, dated Oct. 8, 2019 (6 pages).

* cited by examiner

*Primary Examiner* — Erin E McGrath
(74) *Attorney, Agent, or Firm* — Hamre, Schumann, Mueller & Larson, P.C.

(57) ABSTRACT

A wire feeding system includes a first feeder provided with a first feeding motor that feeds a wire in a wire feeding direction, a second feeder spaced apart from the first feeder in the wire feeding direction and provided with a second feeding motor that feeds the wire in the wire feeding direction, and a controller that controls the rotation speed of the first feeding motor based on a first speed command and controls the rotation speed of the second feeding motor based on a second speed command. The controller gradually changes the second speed command over time when an amount of change of the second speed command is not within a predetermined range.

14 Claims, 12 Drawing Sheets

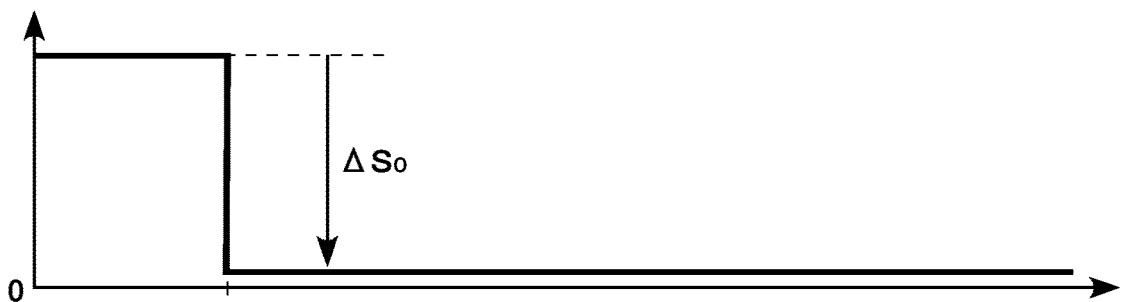
FIG.5A  Speed command $S_0$
$\Delta S_0$
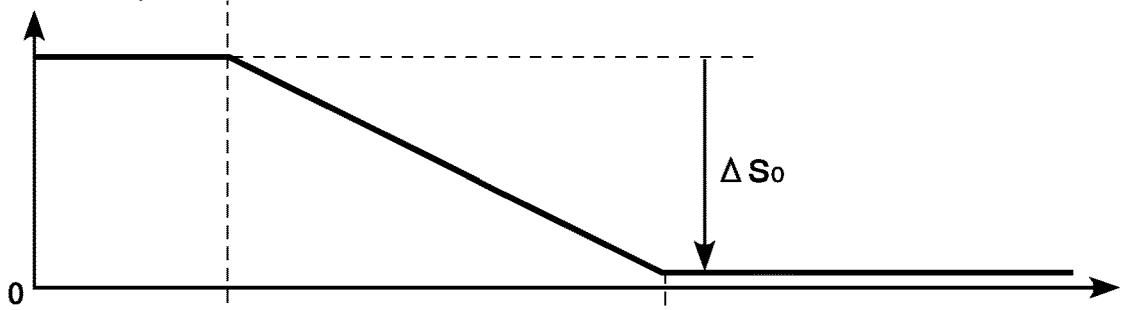
FIG.5B  Speed command $S_2$
$\Delta S_0$
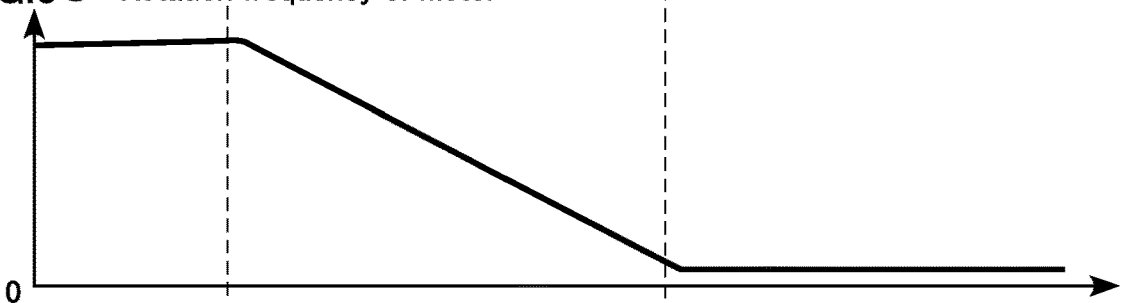
FIG.5C  Rotation frequency of motor
FIG.5D  Drive current
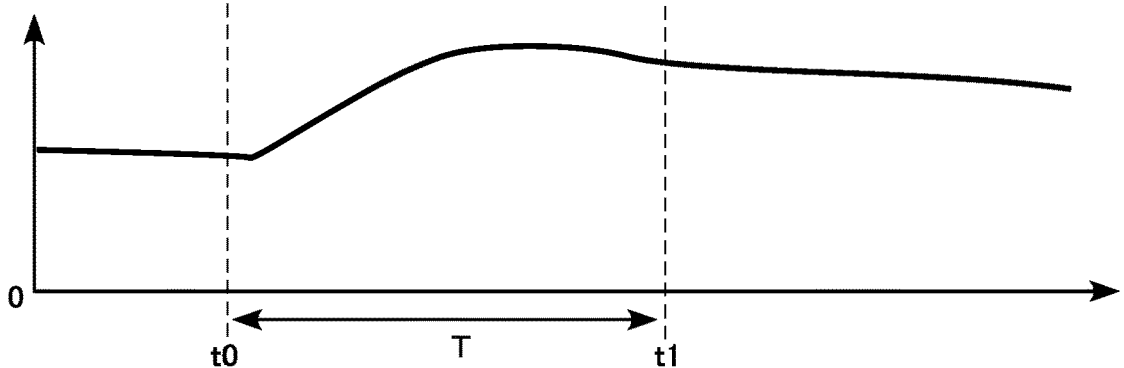
FIG.5E  Power supply voltage
t0   T   t1

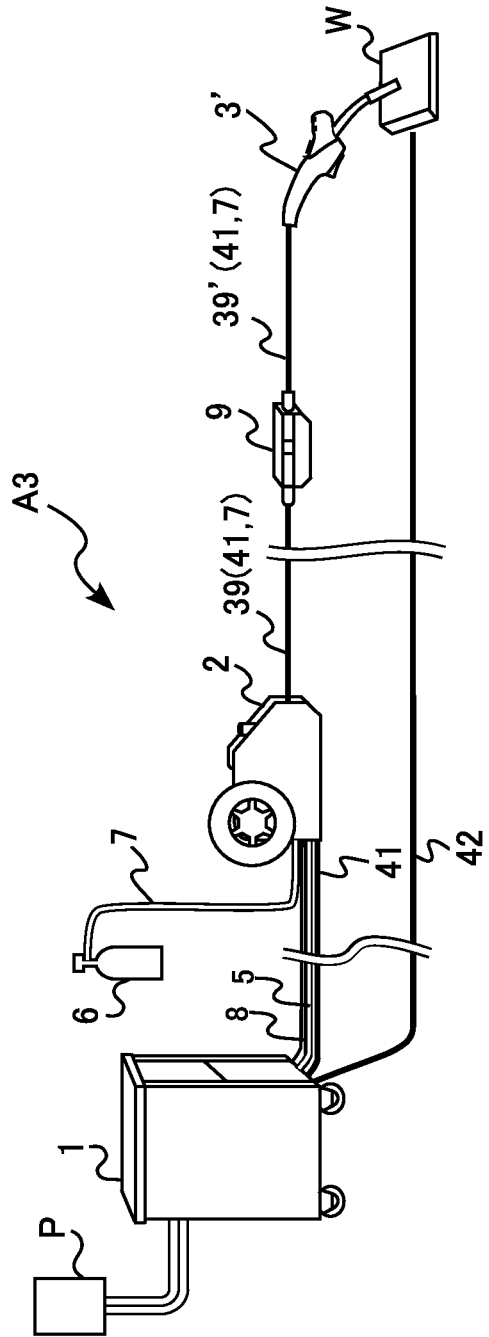

Fig. 12a - Prior Art - Speed command
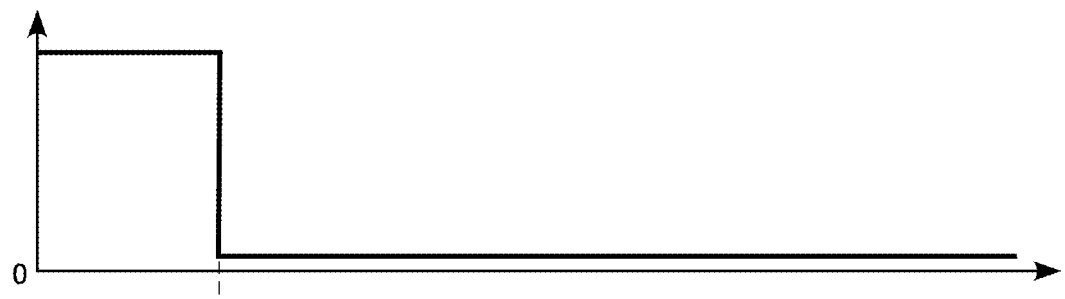
Fig. 12b - Prior Art - Rotation frequency of motor
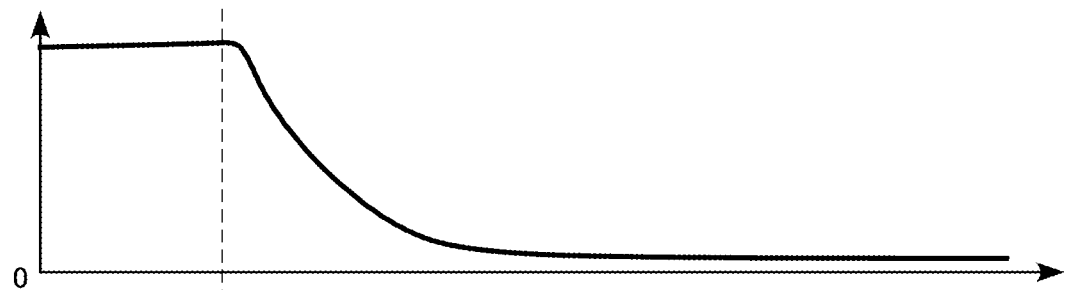
Fig. 12c - Prior Art - Drive current
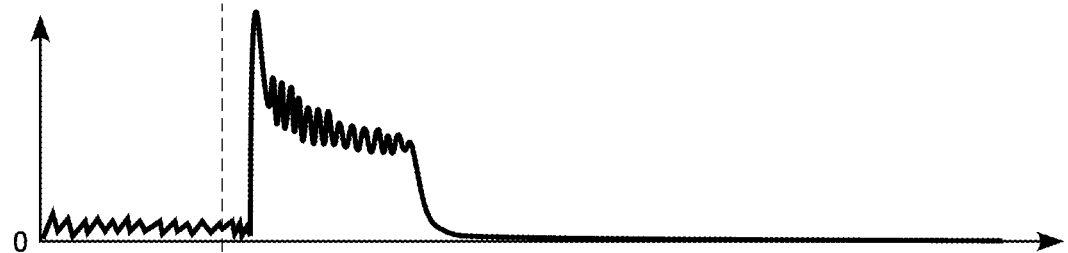
Fig. 12d - Prior Art - Power supply voltage
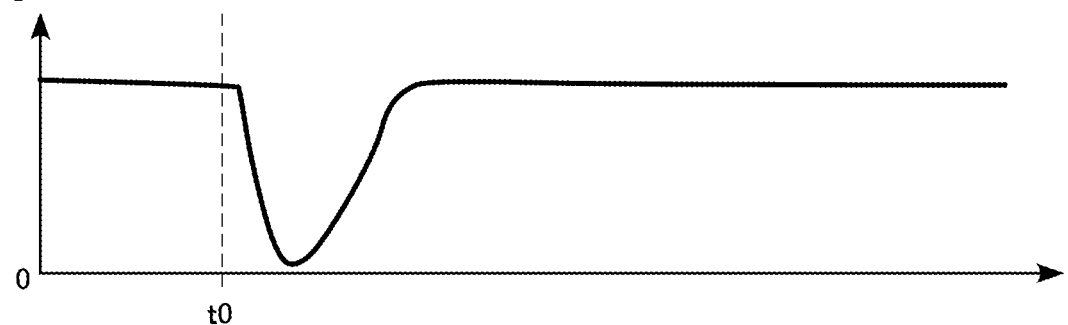

WIRE FEEDING SYSTEM AND WELDING SYSTEM

FIELD

The present disclosure relates to a wire feeding system for feeding a wire, and also to a welding system including the wire feeding system.

BACKGROUND

A consumable electrode type welding system performs welding by using a welding wire fed as an electrode. In such a system, a wire feeding apparatus and a welding torch are connected to each other via a long torch cable so as to allow welding to be performed in a wider area. However, a longer torch cable gives greater resistance to the welding wire being fed, and prevents the welding wire from being moved smoothly. This causes an arc to be unstable. As a method for solving the problem, a structure for feeding a welding wire is provided near an end of the feeding path of the welding wire. This structure pulls the welding wire to apply tension so as to reduce the feed resistance of the welding wire. Such a feeding system for a welding wire is referred to as a push-pull feeding system. An example of a push-pull feeding system is disclosed in JP-A-2006-907.

A pull-side feed mechanism for pulling a welding wire may be mounted on a welding torch. Alternatively, the mechanism may be configured as a pull feeder disposed at a position near the welding torch along the feeding path. The welding torch is held by an operator to perform welding during a welding process. For this reason, it is desirable that the welding torch be compact and lightweight. Also, when the operator moves from one welding spot to the next, the pull feeder is carried to the next welding spot along with the welding torch. Accordingly, it is also desirable that the pull feeder be compact and lightweight. Thus, the welding torch and the pull feeder do not have their respective power supplies for motors and other power supplies for microcomputers for controlling the motors, but share a single power supply for both the motors and the microcomputers. Also, for reduction in size and weight, the power capacity of the power supply is kept relatively low.

In such a configuration, a problem may arise when a command is issued to greatly change the feeding speed of the welding wire. For example, the feeding speed of the welding wire may be greatly changed when the feeding speed is changed along the switching of welding conditions or when a transition to slowdown occurs due to an arc break process. When a command is issued to greatly change the feeding speed, the voltage drops due to the transient response of the motor. As a result, the voltage of the power supply may drop and the voltage supplied to the microcomputer may run short. In this case, an error of voltage abnormality of the power supply may be detected and the supply of the welding power may stop, or the microcomputer may be unable to maintain its operation.

FIGS. 12A-D illustrate a result of simulation regarding the state of the pull-side feed mechanism, in which a speed command for the feeding speed of the welding wire is decreased. FIG. 12A shows a temporal change of the speed command, FIG. 12B shows a temporal change of the rotation frequency (rotation per unit time) of the motor, FIG. 12C shows a temporal change of the drive current from the power supply, and FIG. 12D shows a temporal change of power supply voltage.

When the speed command decreases at t0, the rotation frequency of the motor is decreased to correspond to the speed command. During a transient period in which the motor rotation frequency decreases, a large drive current flows from the power supply. This is because a reverse current is supplied to the motor in order to greatly decrease the rotation frequency of the motor. Since a large drive current flows from the power supply, the power supply voltage is greatly lowered. A greater decrease in the speed command causes a greater decrease in the power supply voltage. When the power supply voltage falls below the threshold value, an error indicating a voltage abnormality is detected. When the power supply voltage further decreases, the microcomputer is reset due to insufficient voltage. Similarly, when the speed command indicates an increase in the feeding speed, the power supply voltage decreases in the transient period in which the rotation frequency of the motor rises.

SUMMARY

The present disclosure has been proposed under the circumstances described above, and an object of the present disclosure is to provide a wire feeding system for push-pull feeding, where the system is capable of preventing a decrease in the power supply voltage on the pull side when the feeding speed of the welding wire is changed. Another object of the present disclosure is to provide a welding system including the above-noted wire feeding system.

According to a first aspect of the present disclosure, there is provided a wire feeding system that includes: a first feeder provided with a first feeding motor that feeds a wire in a wire feeding direction; a second feeder spaced apart from the first feeder in the wire feeding direction and provided with a second feeding motor that feeds the wire in the wire feeding direction; and a controller that controls a rotation speed of the first feeding motor based on a first speed command and controls a rotation speed of the second feeding motor based on a second speed command, where the controller gradually changes the second speed command over time when an amount of change of the second speed command is not within a predetermined range.

According to a second aspect of the present disclosure, there is provided a welding system that includes: a welding torch; a welding power-supply apparatus that supplies power to the welding torch; and a wire feeding system of the first aspect for feeding the wire to the welding torch.

According to the present disclosure, when the controller is to change the feeding speed of the wire, and the amount of change of the second speed command is not within the predetermined range, the controller does not change the second speed command but rather gradually change the second speed command over time. This prevents the voltage of the power supply of the second feeder from being lowered at the time of changing the feeding speed of the wire. As a result, even when the power supply for supplying power to the second feeding motor also supplies power to the microcomputer for controlling the rotation of the second feeding motor, the voltage supplied to the microcomputer is prevented from lowering.

Other features and advantages of the present disclosure will become apparent from the detailed description given below with reference to the accompanying drawings.

DRAWINGS

FIGS. 5A-5E illustrate a result of simulation when a speed command is decreased in value in the welding system of FIG. 1;

FIG. 8 is a schematic diagram showing an overall structure of a welding system according to a third embodiment;

FIGS. 12A-12D illustrate a result of simulation when a speed command is decreased in value in a conventional welding system.

DETAILED DESCRIPTION

The following describes embodiments of the present disclosure with reference to the drawings.

First Embodiment

Figure 1:
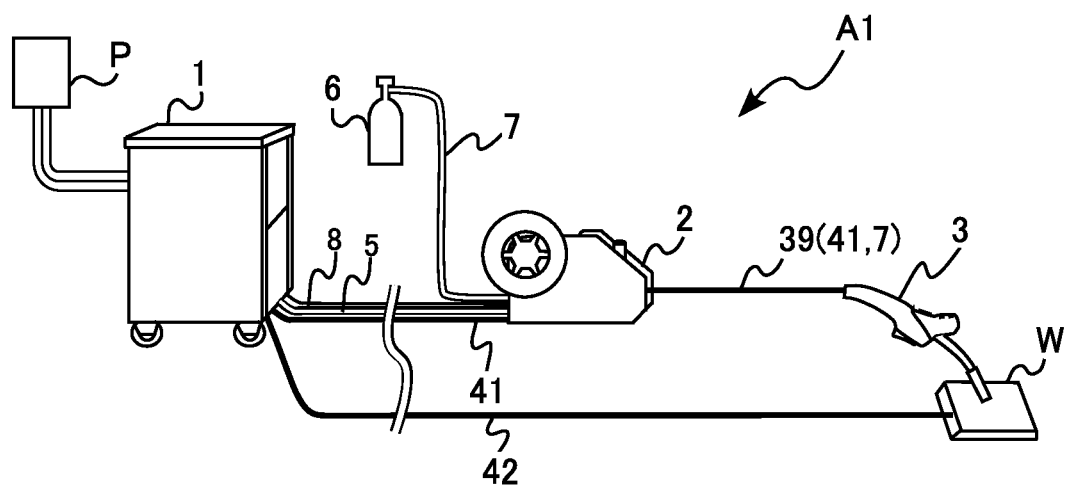
FIG. 1 is a schematic diagram showing an overall structure of a welding system according to a first embodiment.
Figure 2:
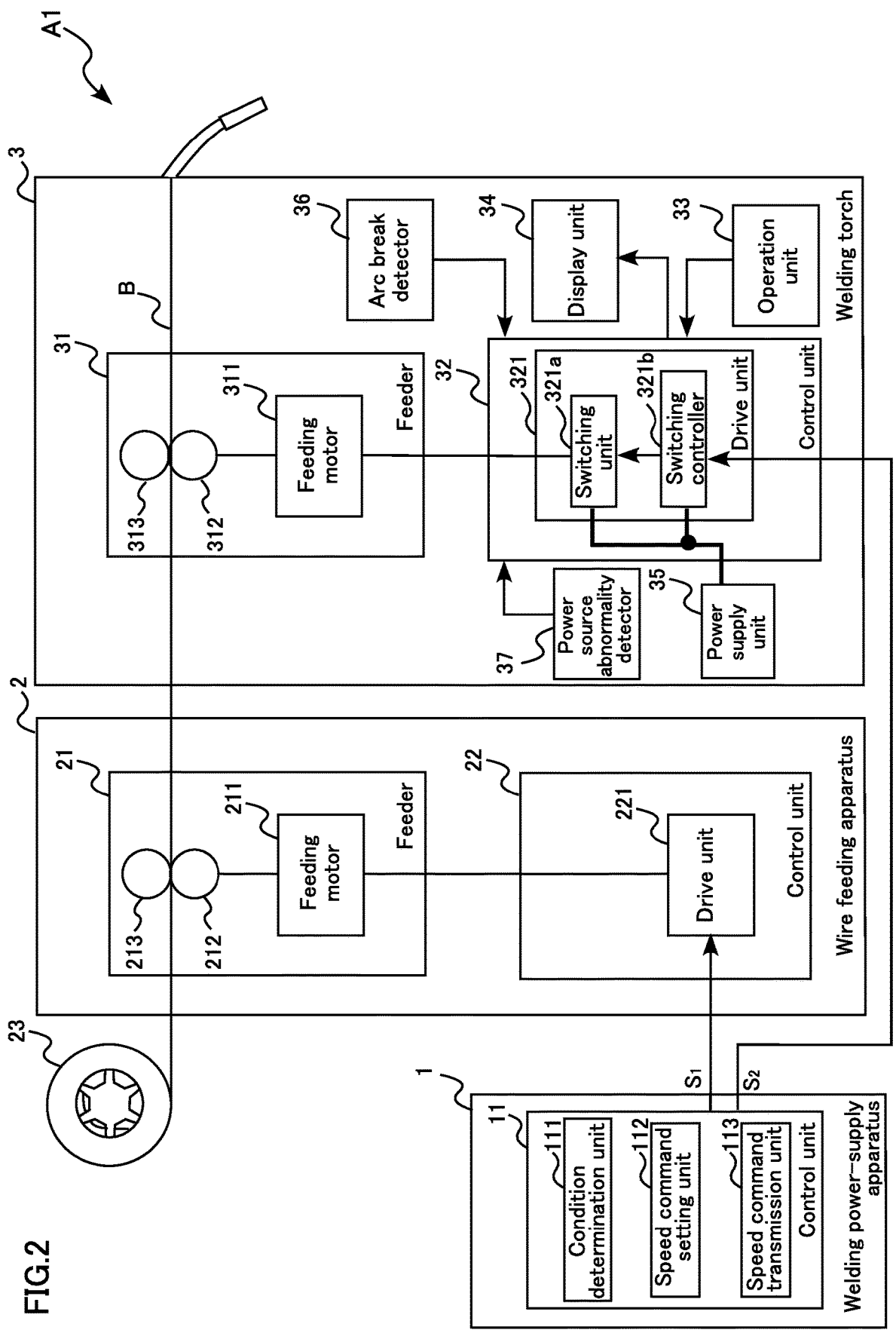
FIG. 2 is a block diagram showing a functional structure of the welding system of FIG. 1.
Figure 3:
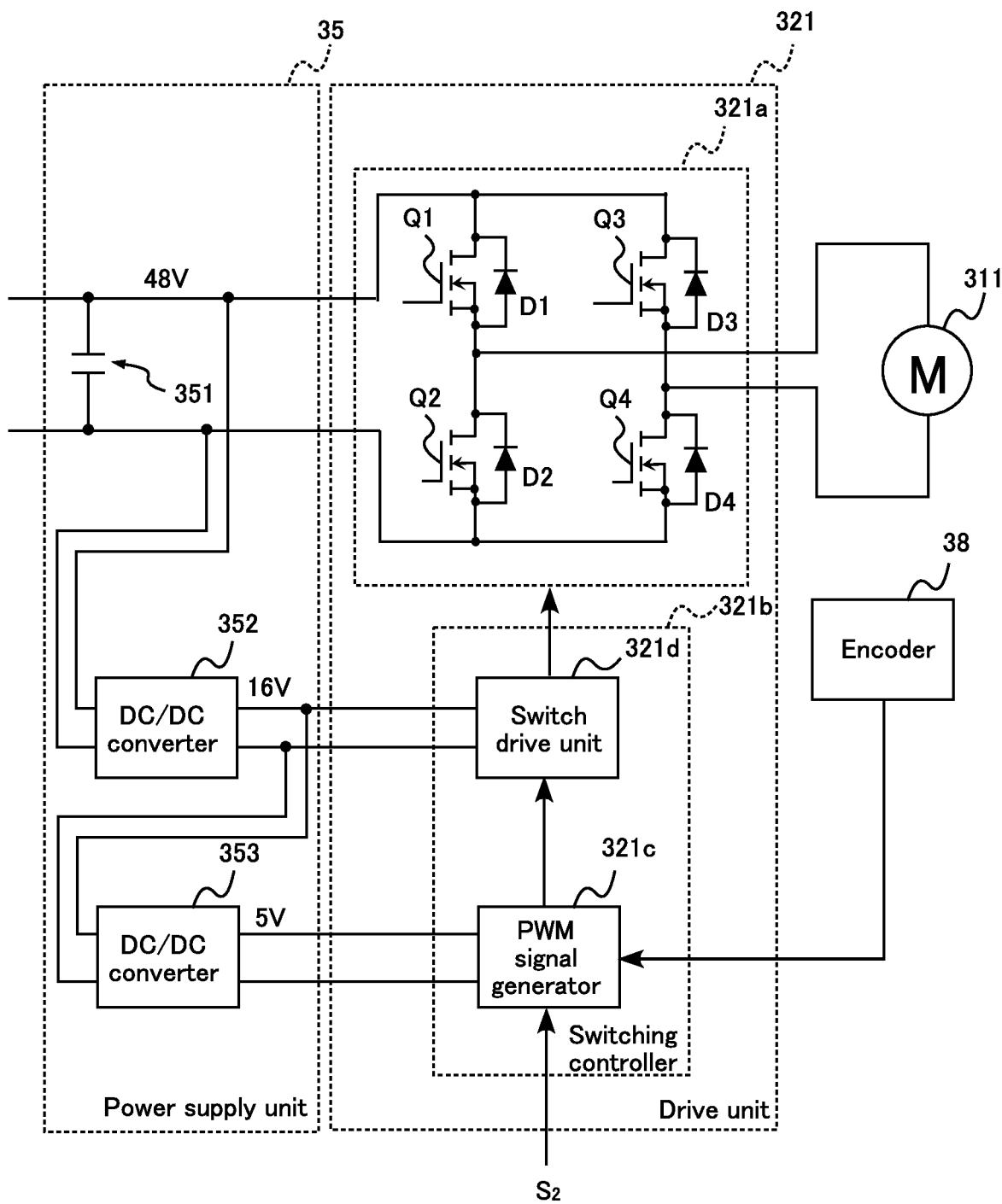
FIG. 3 is a circuit diagram showing an internal configuration of a welding torch of the welding system of FIG. 1.

FIGS. 1 to 3 illustrate a welding system A1 according to a first embodiment. FIG. 1 is a schematic diagram showing an overall structure of the welding system A1. FIG. 2 is a block diagram showing a functional structure of the welding system A1. FIG. 3 is a circuit diagram showing an internal configuration of a welding torch 3.

As shown in FIG. 1, the welding system A1 includes a welding power-supply apparatus 1, a wire feeding apparatus 2, a welding torch 3, power cables 41 and 42, a power transmission line 5, a gas cylinder 6, a gas pipe 7, a communication line 8, and a torch cable 39. The welding power-supply apparatus 1 and the wire feeding apparatus 2 are connected to each other via the power cable 41, the power transmission line 5, and the communication line 8. The wire feeding apparatus 2 and the welding torch 3 are connected to each other via the torch cable 39. The torch cable 39 includes the power cable 41, the gas pipe 7, a liner, a power transmission line, and a communication line. The torch cable 39 may have a length of ten and several meters, for example. The liner arranged in the torch cable 39 is a part of the feeding path of a welding wire B. Since the torch cable 39 is long, the feeding path is also long. The power cable 41, the gas pipe 7, the liner, the power transmission line, and the communication line inside the torch cable 39 are respectively connected to the power cable 41, the gas pipe 7, the liner, the power transmission line 5, and the communication line 8 inside the wire feeding apparatus 2.

One output terminal of the welding power-supply apparatus 1 is connected to the welding torch 3 via the power cable 41. The wire feeding apparatus 2 feeds the welding wire B to the welding torch 3 such that a tip of the welding wire B protrudes from a tip of the welding torch 3. The power cable 41 and the welding wire B are electrically connected to each other via a contact tip (not shown) arranged at the tip of the welding torch 3. Another output terminal of the welding power-supply apparatus 1 is connected to a workpiece W via a power cable 42. The welding power-supply apparatus 1 generates an arc between the tip of the welding wire B which protrude from the tip of the welding torch 3 and the workpiece W, and supplies power to the arc. The welding system A1 welds the workpiece W with the heat from the arc.

As shown in FIG. 2, the welding torch 3 includes a feeder 31 configured to feed the welding wire B. That is, the feeding path of the welding wire B is provided with two feeders, i.e., a feeder 21 (wire feeding apparatus 2) and the feeder 31 (welding torch 3) so as to feed the welding wire B. The feeder 21 (wire feeding apparatus 2) is a push feeder that feeds the welding wire B in a feeding direction (a direction in which the welding wire B travels). The feeder 31 (welding torch 3) is a pull feeder that is arranged more downstream than the feeder 21 (wire feeding apparatus 2) in the feeding direction, and pulls the welding wire B in the feeding direction. In other words, the feeder 21 (wire feeding apparatus 2) and the feeder 31 (welding torch 3) constitute a push-pull wire feeding system.

The welding power-supply apparatus 1 supplies power (e.g., DC 48V) for driving components, such as a feeding motor 211, to the wire feeding apparatus 2 via the power transmission line 5. The power supplied from the welding power-supply apparatus 1 is also supplied from the wire feeding apparatus 2 to the welding torch 3 via the power transmission line (not shown) inside the torch cable 39. Note that the welding torch 3 may receive power directly from the welding power-supply apparatus 1. Furthermore, the wire feeding apparatus 2 and the welding torch 3 may receive power from an apparatus other than the welding power-supply apparatus 1.

The welding power-supply apparatus 1 and the wire feeding apparatus 2 communicate with each other via the communication line 8. The wire feeding apparatus 2 and the welding torch 3 communicate with each other via the communication line (not shown) inside the torch cable 39. The welding torch 3 and the welding power-supply apparatus 1 communicate with each other via the wire feeding apparatus 2. Note that the welding torch 3 and the welding power-supply apparatus 1 may directly communicate with each other. In addition, the communication is not particularly limited and may be power-line carrier communication using the power transmission lines and the power cables 41 and 42, or may be wireless communication. Also, the welding power-supply apparatus 1, the wire feeding apparatus 2, and the welding torch 3 may exchange information via a control line using voltage and current levels and pulses.

The welding system A1 uses a shield gas during welding. The shield gas in the gas cylinder 6 is supplied to the tip of the welding torch 3 by means of the gas pipe 7 that runs through the wire feeding apparatus 2. Note that the welding system A1 may circulate cooling water through the welding torch 3.

The welding power-supply apparatus 1 supplies power for arc welding to the welding torch 3. The welding power-supply apparatus 1 converts three-phase AC power received from a power system P into power suitable for arc welding, and outputs the converted power. The welding power-supply apparatus 1 also convers the three-phase AC power received from the power system P into DC power for driving the feeding motor 211 or the like of the wire feeding apparatus 2, and outputs the DC power to the wire feeding apparatus 2 via the power transmission line 5.

The welding system A1 is provided with some controlling means or controller for e.g. managing and/or adjusting various processes needed to be performed for proper function of the systems. In the illustrated example, the controller is made up of at least three control units 11, 22 and 32, though the other embodiments of the present disclosure are not limited to this. For instance, the controller of a welding system of the present disclosure may be made up of only one control unit or two control units depending on the specific situations.

Referring to FIG. 2, the control unit 11 of the welding power-supply apparatus 1 is implemented by a microcomputer, for example, which is incorporated in the welding power-supply apparatus 1. The control unit 11 controls an inverter circuit (not shown) so as to output power according to a set welding condition. The control unit 11 also controls feeding of the welding wire B during welding and during inching, by controlling the feeder 21 and the feeder 31 via a control unit 22 of the wire feeding apparatus 2 and a control unit 32 of the welding torch 3. Specifically, the control unit 11 transmits a speed command (first speed command) $S_1$ indicating a feeding speed of the welding wire B, to the control unit 22 of the wire feeding apparatus 2. The control unit 11 also transmits a speed command (second speed command) $S_2$ indicating a feeding speed of the welding wire B to the control unit 32 of the welding torch 3. Details of the feed control of the welding wire B by the control unit 11 are described below.

The wire feeding apparatus 2 feeds the welding wire B to the welding torch 3. As shown in FIG. 2, the wire feeding apparatus 2 includes the feeder 21 and the control unit 22.

The feeder 21 is configured to be driven by a drive signal received from the control unit 22, and to feed the welding wire B. The feeder 21 includes the feeding motor 211, a feeding roll 212, and a pressure roll 213.

The feeding motor 211 generates a drive force for feeding the welding wire B. The feeding motor 211 is driven by a drive signal received from the control unit 22 (from a drive unit 221 described below). The feeding motor 211 is a brushless motor, for example, and its rotation speed is controlled by adjusting the drive signal. The control unit 22 (drive unit 221 described below) controls the rotation speed of the feeding motor 211 by adjusting the pulse width of the drive signal by pulse width modulation, for example.

The feeding roll 212 is attached to a rotary shaft of the feeding motor 211, and rotates with torque generated and transmitted by the feeding motor 211. Note that the feeding roll 212 may not be directly attached to the rotary shaft of the feeding motor 211. The feeding roll 212 may be rotated with one or more gears that transmit the torque of the feeding motor 211 to the feeding roll 212. The welding wire B is in contact with the feeding roll 212, and the torque of the feeding motor 211 is converted into a tangential force for feeding the welding wire B. This allows for feeding of the welding wire B when the feeding motor 211 is driven.

The pressure roll 213 faces the feeding roll 212 with the welding wire B therebetween, and presses the welding wire B toward the feeding roll 212. This causes the welding wire B to be fed according to the rotation of the feeding roll 212.

The control unit 22 is implemented by a microcomputer, for example, and controls the wire feeding apparatus 2. The control unit 22 causes the feeder 21 to be driven so as to feed the welding wire B, based on a command from the control unit 11 of the welding power-supply apparatus 1. The control unit 22 also causes a gas solenoid valve (not shown) to be open so as to supply a shield gas to the welding torch 3. Note that the gas solenoid valve may be directly controlled by the control unit 11. As shown in FIG. 2, the control unit 22 includes the drive unit 221.

The drive unit 221 controls drive of the feeder 21 and thereby controls feeding of the welding wire B. The drive unit 221 outputs a drive signal to the feeding motor 211 of the feeder 21, based on the speed command $S_1$ received from the control unit 11 of the welding power-supply apparatus 1. The feeding motor 211 has an encoder (not shown) attached thereto, and the control unit 22 detects the rotation speed of the feeding motor 211 from a pulse signal received from the encoder. In the present embodiment, the encoder is an optical encoder which is larger but more accurate than a magnetic encoder. Note that the encoder is not particularly limited, and may be a magnetic encoder instead. The drive unit 221 performs feedback control by adjusting the drive signal so that the detected rotation speed of the feeding motor 211 coincides with the rotation speed corresponding to the speed command $S_1$. The method for detecting the rotation speed is not particularly limited.

Although not shown in figures, the wire feeding apparatus 2 includes tubular guide members such as an inlet liner, an inlet guide, and an outlet guide. The inlet liner and the inlet guide both guide the welding wire B from a wire reel 23, around which the welding wire B is wound, to the feeding roll 212. The outlet guide guides the welding wire B fed by the feeding roll 212 to a feeding port of the wire feeding apparatus 2. The welding wire B fed from the wire feeding apparatus 2 passes through the liner inside the torch cable 39 and the liner inside the welding torch 3, and then is guided to the tip of the welding torch 3. The guide members, such as the inlet liner, the inlet guide, and the outlet guide, and the liners provided inside the torch cable 39 and the welding torch 3 constitute the feeding path of the welding wire B.

The welding torch 3 welds the workpiece W with the welding power supplied from the welding power-supply apparatus 1. The welding torch 3 also has a structure for feeding the welding wire B, and reduces the feed resistance of the welding wire B by pulling the welding wire B and applying tension. As shown in FIG. 2, the welding torch 3 includes the feeder 31, the control unit 32, an operation unit 33, a display unit 34, a power supply unit 35, an arc break detector 36, and a power source abnormality detector 37.

The feeder 31 is configured to be driven by a drive signal received from the control unit 32, and to pull the welding wire B. The feeder 31 includes a feeding motor 311, a feeding roll 312, and a pressure roll 313.

The feeding motor 311 generates a drive force for feeding the welding wire B. The feeding motor 311 is driven by a drive signal received from the control unit 32 (from a drive unit 321 described below). The feeding motor 311 is a brushless motor, for example, and its rotation speed is controlled by adjusting the drive signal. The control unit 32 (the drive unit 321 described below) controls the rotation speed of the feeding motor 311 by adjusting the pulse width of the drive signal by pulse width modulation, for example. The feeding motor 311 is relatively small to reduce the size and weight of the welding torch 3, and is smaller than the feeding motor 211 of the wire feeding apparatus 2. The feeding motor 311 has a smaller output than the feeding motor 211.

The feeding roll 312 is attached to a rotary shaft of the feeding motor 311, and rotates with torque generated and transmitted by the feeding motor 311. The method for transmitting the torque of the feeding motor 311 to the feeding roll 312 is not limited. The welding wire B is in contact with the feeding roll 312, and the torque of the feeding roll 312 is converted into a tangential force for pulling the welding wire B. Accordingly, the welding wire B is pulled when the feeding motor 311 is driven.

The pressure roll 313 faces the feeding roll 312 with the welding wire B therebetween, and presses the welding wire B toward the feeding roll 312. This causes the welding wire B to be fed according to the rotation of the feeding roll 312. The pressure force of the pressure roll 313 is set smaller than the pressure force of the pressure roll 213 of the feeder 21.

The control unit 32 is implemented by a microcomputer, for example, and controls the welding torch 3. The control unit 32 performs a predetermined process according to an operation signal received from the operation unit 33. The control unit 32 also controls communications between the welding power-supply apparatus 1 and the wire feeding apparatus 2, writing and reading of information to/from a storage (not shown), reception of an operation signal from the operation unit 33 and performance of the corresponding process, display by the display unit 34, and so on. The control unit 32 also causes the feeder 31 to be driven so as to feed the welding wire B, based on a command from the control unit 11 of the welding power-supply apparatus 1. As shown in FIG. 2, the control unit 32 includes a drive unit 321.

The drive unit 321 controls drive of the feeder 31 and thereby controls feeding of the welding wire B. The drive unit 321 outputs a drive signal to the feeding motor 311 of the feeder 31, based on the speed command $S_2$ received from the control unit 11 of the welding power-supply apparatus 1. The drive unit 321 includes a switching unit 321a and a switching controller 321b.

The switching unit 321a outputs a drive signal to the feeding motor 311. The switching unit 321a generates the drive signal by switching between ON and OFF of a built-in switching element based on a switch drive signal received from the switching controller 321b. As shown in FIG. 3, the switching unit 321a includes a full bridge circuit having four switching elements Q1 to Q4 and four diodes D1 to D4. In the present embodiment, the switching elements Q1 to Q4 are metal oxide semiconductor field effect transistors (MOSFETs). The switching elements Q1 to Q4 are not limited to MOSFETs, and may be bipolar transistors, insulated gate bipolar transistors (IGBTs), or the like. The switching element Q1 and the switching element Q2 are connected in series to forma bridge structure. Similarly, the switching element Q3 and the switching element Q4 are connected in series to form a bridge structure. The feeding motor 311 is connected between a junction of the switching element Q1 and the switching element Q2 and a junction of the switching element Q3 and the switching element Q4. Each of the switching elements Q1 to Q4 has a gate terminal that receives a switch drive signal output from the switching controller 321b. The diodes D1 to D4 are connected in antiparallel to the switching elements Q1 to Q4, respectively. Each of the switching elements Q1 to Q4 can switch between ON state and OFF state, based on the switch drive signal. The switching unit 321a is supplied with a voltage of 48 V from the power supply unit 35, for example. The switching unit 321a is not limited in terms of circuit configuration, and may include a half bridge circuit, for example.

The switching controller 321b controls the switching unit 321a. The switching controller 321b detects the rotation speed of the feeding motor 311 from a pulse signal, which is a signal input from an encoder 38 attached to the feeding motor 311. In the present embodiment, the encoder 38 is a magnetic encoder that is relatively small to reduce the size and weight of the welding torch 3. Note that the encoder is not particularly limited, and may be an optical encoder instead. The method for detecting the rotation speed is not particularly limited. The switching controller 321b performs feedback control such that the detected rotation speed of the feeding motor 311 coincides with the rotation speed corresponding to the speed command $S_2$, generates a switch drive signal, and outputs the switch drive signal to the switching unit 321a. As shown in FIG. 3, the switching controller 321b includes a PWM signal generator 321c and a switch drive unit 321d.

The PWM signal generator 321c is implemented by a microcomputer, for example, and generates a PWM signal for controlling the rotation speed of the feeding motor 311. The PWM signal generator 321c generates the PWM signal based on a difference between the detected rotation speed of the feeding motor 311 and the rotation speed corresponding to the speed command $S_2$.

In a normal state, the PWM signal generator 321c generates a PWM signal for the switching elements Q1 and Q4. When the detected rotation speed is lower than the rotation speed corresponding to the speed command $S_2$, the PWM signal generator 321c increases the pulse width of the PWM signal to increase the rotation speed of the feeding motor 311. When the detected rotation speed is higher than the rotation speed corresponding to the speed command $S_2$, the PWM signal generator 321c decreases the pulse width of the PWM signal to decrease the rotation speed of the feeding motor 311.

If the speed command $S_2$ greatly decreases, the rotation speed cannot be sufficiently decreased by simply shortening the ON periods of the switching elements Q1 and Q4 (reducing the pulse width of the PWM signal). Accordingly, the switching elements Q1 and Q4 are turned off, and a PWM signal for turning on and off the switching elements Q2 and Q3 is generated. As a result of turning on and off the switching elements Q2 and Q3, a large reverse current flows through the feeding motor 311 and decreases the rotation speed of the feeding motor 311. However, the voltage of a capacitor 351 in the power supply unit 35 decreases, due to a large drive current flowing from the power supply unit 35. On the other hand, if the speed command $S_2$ greatly increases, the ON periods of the switching elements Q1 and Q4 are significantly lengthened, causing the current flowing through the feeding motor 311 to abruptly increase. Since a large drive current flows from the power supply unit 35, the voltage of the capacitor 351 in the power supply unit 35 decreases. In order to prevent such a voltage drop, the present embodiment includes a feeding-speed abrupt change process described below. This process is performed to prevent an abrupt change in the speed command $S_2$.

The PWM signal generator 321c outputs a generated PWM signal to the switch drive unit 321d. The PWM signal generator 321c (microcomputer) is supplied with a voltage of 5 V from the power supply unit 35, for example.

The switch drive unit 321d generates a switch drive signal obtained by amplifying the PWM signal. The switch drive unit 321d receives the PWM signal from the PWM signal generator 321c, amplifies the PWM signal to a level sufficient for driving the switching elements Q1 to Q4, and outputs the amplified signal to the switching unit 321a as a switch drive signal. The switch drive unit 321d is supplied with a voltage of 16 V from the power supply unit 35, for example.

Returning to FIG. 2, the display unit 34 performs various display operations, and includes a display (not shown) which is a liquid crystal display device, for example. The display unit 34 is controlled by the control unit 32, and displays various types of information. Note that the display unit 34 may be controlled by either the control unit 11 or the control unit 22, or may be controlled by another control unit. Also, the display unit 34 may not be necessarily provided, or may be provided in the wire feeding apparatus 2.

The operation unit 33 includes a plurality of operation means, and outputs, to the control unit 32, operation signals that indicate user operations on the operation means. Examples of the operation means include a torch switch, an inching button, and an operation button, which are not shown. The operation unit 33 may include other means. Note that the operation unit 33 may output an operation signal to either the control unit 11 or the control unit 22, or may output an operation signal to another control unit. Also, the operation unit 33 may be provided in the wire feeding apparatus 2.

The torch switch is an operation means for receiving a start/stop operation of welding. When the torch switch is turned on (pressed down), an operation signal is output to the control unit 32. Upon receiving the operation signal, the control unit 32 generates a signal indicating a start of welding and transmits the signal to the welding power-supply apparatus 1. Upon receiving the signal, the welding power-supply apparatus 1 starts feeding the welding wire B and starts outputting welding power. When the torch switch is turned off, an operation signal is output to the control unit 32. Upon receiving the operation signal, the control unit 32 generates a signal indicating an end of welding and transmits the signal to the welding power-supply apparatus 1. Upon receiving the signal, the welding power-supply apparatus 1 stops feeding the welding wire B and stops outputting the welding power. In this way, welding is performed only while the torch switch is pressed down. The transmission of the on/off operation of the torch switch may be performed by changing the level of an electric signal via the control line. The operation signals may be output to the control unit 11.

The inching button is an operational means for receiving start/stop operations of inching. When the inching button is activated (pressed down), an operation signal is output to the control unit 32. Upon receiving the operation signal, the control unit 32 generates a signal indicating a start of inching and transmits the signal to the welding power-supply apparatus 1. Upon receiving the signal, the welding power-supply apparatus 1 starts feeding the welding wire B. When the inching button is deactivated (released), an operation signal is output to the control unit 32. Upon receiving the operation signal, the control unit 32 generates a signal indicating an end of inching and transmits the signal to the welding power-supply apparatus 1. Upon receiving the signal, the welding power-supply apparatus 1 stops feeding the welding wire B. In this way, the welding wire B is fed only while the inching button is pressed down. Note that the method for operating the inching button is not limited. For example, start and stop of feeding the welding wire B may be switched every time the inching button is pressed. The transmission of the on/off operation of the inching button may be performed by changing the level of an electric signal via the control line. The inching button may be provided in the welding power-supply apparatus 1 or the wire feeding apparatus 2.

The operation button is an operation means for switching screens and changing various setting values. The operation button may include an upper button, a lower button, a left button, and a right button. When any of the buttons is pressed, an operation signal corresponding to the button is output to the control unit 32, and the control unit 32 performs the corresponding operation. For example, when the left button or the right button is pressed, the mode may be switched and the screen on the display may be switched. When the upper button or the lower button is pressed, the setting value on the display may be changed. For example, an operator may switch setting modes of welding conditions by pressing the left button or the right button, and may select a desired welding condition by pressing the upper button or the lower button. In this case, if the welding condition is switched to a condition with a different feeding speed, the feeding-speed abrupt change process described below may be performed depending on an amount of change in the feeding speed. The welding condition may be switched by an operation on the torch switch, or may be automatically switched based on a torch angle or the like detected by an acceleration sensor.

The arc break detector 36 detects an arc break. The arc break detector 36 includes a voltage sensor for detecting a welding voltage, for example, and detects an arc break based on the detected voltage. When detecting an arc break, the arc break detector 36 outputs a detection signal to the control unit 32. Upon receiving the detection signal, the control unit 32 transmits a signal indicating an arc break to the welding power-supply apparatus 1. Upon receiving the signal, the welding power-supply apparatus 1 performs an arc break process. In the arc break process, the welding power-supply apparatus 1 changes the current feeding speed to a feeding speed for slowdown. At this time, the feeding-speed abrupt change process described below may be performed depending on an amount of change in the feeding speed. Note that the method for detecting an arc break is not limited, and an arc break may be detected based on a detected welding current. Also, the arc break detector 36 may directly input a detection signal to the welding power-supply apparatus 1, instead of inputting the signal to the control unit 32. Furthermore, the welding power-supply apparatus 1 may include the arc break detector 36.

The power supply unit 35 is supplied with power from a power supply unit (not shown) in the wire feeding apparatus 2 via a power transmission line (not shown), and supplies power to each unit of the welding torch 3. The power supply unit 35 may be supplied with power directly from the welding power-supply apparatus 1, or may be supplied with power from an apparatus other than the welding power-supply apparatus 1 or the wire feeding apparatus 2. As shown in FIG. 3, the power supply unit 35 includes the capacitor 351 and DC/DC converters 352 and 353.

The capacitor 351 stores power supplied thereto. The DC/DC converter 352 adjusts the voltage output to the switch drive unit 321d, and decreases the voltage across the terminals of the capacitor 351 to a voltage suitable for the switch drive unit 321d to output the voltage. The DC/DC converter 353 adjusts the voltage output to the PWM signal generator 321c. Specifically, the DC/DC converter 353 decreases the output voltage of the DC/DC converter 352 to a voltage suitable for the PWM signal generator 321c, and outputs the voltage. In the present embodiment, the power supply unit 35 is supplied with a voltage of 48 V, for example, and stores power in the capacitor 351. The power supply unit 35 then supplies an inter-terminal voltage of 48 V of the capacitor 351 to the switching unit 321a. The power supply unit 35 also decreases an inter-terminal voltage of 48 V of the capacitor 351 to 16 V, for example, by use of the DC/DC converter 352, and supplies the voltage to the switch drive unit 321d. The power supply unit 35 also decreases an output voltage of 16 V of the DC/DC converter 352 to 5 V, for example, by use of the DC/DC converter 353, and supplies the voltage to the PWM signal generator 321c. The DC/DC converter 353 may decrease a supplied voltage of 48 V to 5 V, and supply the voltage to the PWM signal generator 321c.

The power source abnormality detector 37 detects an abnormality of the power supply unit 35. The power source abnormality detector 37 includes a voltage sensor for detecting the inter-terminal voltage of the capacitor 351, and detects a low voltage abnormality of the power supply unit 35 based on the detected voltage. When detecting a low voltage abnormality, the power source abnormality detector 37 outputs a detection signal to the control unit 32. Upon receiving the detection signal, the control unit 32 causes the display unit 34 to indicate the abnormality on the screen. The control unit 32 also transmits a signal indicating the low voltage abnormality to the welding power-supply apparatus 1. Upon receiving the signal, the welding power-supply apparatus 1 stops outputting the welding power and feeding the welding wire B. In the present embodiment, the feeding-speed abrupt change process described below is performed to prevent a low voltage abnormality of the power supply unit 35. Note that the method for detecting a low voltage abnormality is not limited. Also, the power source abnormality detector 37 may directly input a detection signal to the welding power-supply apparatus 1, instead of inputting the signal to the control unit 32. Furthermore, the power source abnormality detector 37 may be included in either the welding power-supply apparatus 1 or the wire feeding apparatus 2.

Next, the feed control of the welding wire B by the control unit 11 will be described.

The control unit 11 of the welding power-supply apparatus 1 transmits the speed command $S_1$ to the control unit 22 of the wire feeding apparatus 2, and the speed command $S_2$ to the control unit 32 of the welding torch 3, thereby controlling the feeding of the welding wire B. The control unit 22 controls the feeder 21 based on the received speed command $S_1$. The control unit 32 controls the feeder 31 based on the received speed command $S_2$. The control unit 11 transmits the speed commands $S_1$ and $S_2$ so that the feeding speed of the feeder 31 is greater than the feeding speed of the feeder 21 by several percent. The feeding speed of the feeder 21 is the surface speed of a part of the feeding roll 212 that rotates by the drive of the feeding motor 211, where the part is in contact with the welding wire B. The feeding speed of the feeder 31 is the surface speed of a part of the feeding roll 312 that rotates by the drive of the feeding motor 311, where the part is in contact with the welding wire B. Specifically, the control unit 11 sets the speed command $S_2$ to have a value greater than the speed command $S_1$ by approximately several percent, so that the feeding speed of the feeder 31 is greater than the feeding speed of the feeder 21 by several percent. Since the feeding speed of the feeder 31 (pull feeder) is greater than the feeding speed of the feeder 21 (push feeder), tension is applied to the welding wire B. This, as a result, suppresses the feed resistance of the welding wire B, and prevents buckling of the welding wire B. As described above, the welding wire B slips against the feeding roll 312 and the pressure roll 313 of the feeder 31 (pull feeder), allowing the welding wire B to be fed at the speed corresponding to the speed command $S_1$.

When the speed command $S_2$ greatly decreases, a large reverse current flows through the feeding motor 311 to abruptly decrease the rotation speed of the feeding motor 311. As a result, the drive current from the power supply unit 35 increases to cause lowering of the voltage of the capacitor 351 in the power supply unit 35. Also, when the speed command $S_2$ greatly increases, a large current flows through the feeding motor 311 to abruptly increase the rotation speed of the feeding motor 311. As a result, the drive current from the power supply unit 35 increases to cause lowering of the voltage of the capacitor 351 in the power supply unit 35. In the present embodiment, under a predetermined condition, the control unit 11 does not change the speed command $S_2$ at once, but rather changes it slope-wise or stepwise. This process is performed to prevent a voltage drop of the power supply unit 35 caused by an abrupt change in the feeding speed of the welding wire B. In the following description, this process is referred to as "feeding-speed abrupt change process".

As shown in FIG. 2, the control unit 11 includes a condition determination unit 111, a speed command setting unit 112, and a speed command transmission unit 113 as internal configurations for a feed control.

The condition determination unit 111 is a functional block that determines whether to perform the feeding-speed abrupt change process. The feeding-speed abrupt change process is performed when the amount of change in the feeding speed is not within a predetermined range. The amount of change in the feeding speed is obtained by subtracting the feeding speed before change from the feeding speed after the change. The value of the amount of change is positive when the feeding speed increases, and is negative when the feeding speed decreases. When the absolute value of the amount of change in the feeding speed is small, the rotation speed of the feeding motor 311 does not need to change abruptly. Because of this, a voltage drop regarding the capacitor 351 of the power supply unit 35 is not significant. Accordingly, there is no need for the feeding-speed abrupt change process. The condition determination unit 111 determines whether the amount of change in the feeding speed is within a predetermined range. Specifically, the condition determination unit 111 determines whether an amount of change $\Delta S_0$ or the difference between the speed command $(S_0+\Delta S_0)$ corresponding to the feeding speed after change and the speed command $(S_0)$ corresponding to the feeding speed before change is within the range from a threshold value $\Delta Sth1$ to a threshold value $\Delta Sth2$ ($>\Delta Sth1$). In other words, the condition determination unit 111 determines if $\Delta Sth1 < \Delta S_0 < \Delta Sth2$.

The threshold value $\Delta Sth1$ is the lower-limit value for the amount of change $\Delta S_0$ ($<0$) of the speed command when the feeding speed is decreased, and is used to determine whether to perform the feeding-speed abrupt change process. The threshold value $\Delta Sth1$ is set to a value corresponding to $-2.2$ to $-4.4$ m/min (i.e., 10 to 20% decrease of a maximum feeding speed of 22 m/min), for example. The threshold value $\Delta Sth2$ is the upper-limit value for the amount of change $\Delta S_0$ ($>0$) of the speed command when the feeding speed is increased, and is used to determine whether to perform the feeding-speed abrupt change process. The threshold value $\Delta Sth2$ is set to a value corresponding to 2.2 to 4.4 m/min (i.e., 10 to 20% increase of a maximum feeding speed of 22 m/min), for example. Note that the threshold value $\Delta Sth1$ and the threshold value $\Delta Sth2$ are not limited to the above values. The absolute value of the threshold value $\Delta Sth1$ may be the same as or different from the absolute value of the threshold value $\Delta Sth2$. Also, the threshold value $\Delta Sth1$ and the threshold value $\Delta Sth2$ do not need to be fixed values, and may be changed by the speed command $S_0$ before change. The threshold value $\Delta Sth1$ and the threshold value $\Delta Sth2$ are appropriately set based on experiments and simulation results, so that the power supply unit 35 does not suffer from a voltage abnormality by the change in the feeding speed.

When determining that the amount of change in the feeding speed is not within the predetermined range, the condition determination unit 111 determines that it is necessary to perform the feeding-speed abrupt change process. In other words, when the amount of change $\Delta S_0$ in the speed command is not within the range from the threshold value $\Delta Sth1$ (e.g., a value corresponding to −2.2 to −4.4 m/min) to the threshold value $\Delta Sth2$ (e.g., a value corresponding to 2.2 to 4.4 m/min), the condition determination unit 111 determines that it is necessary to perform the feeding-speed abrupt change process. On the other hand, when determining that the amount of change in the feeding speed is within the predetermined range, the condition determination unit 111 determines that there is no need for the feeding-speed abrupt change process. The condition determination unit 111 outputs the determination result to the speed command setting unit 112.

The speed command setting unit 112 is a functional block for setting the speed command $S_1$ on the push side and the speed command $S_2$ on the pull side. Specifically, the speed command setting unit 112 sets the speed commands $S_1$ and $S_2$ based on the determination result of the condition determination unit 111.

When the condition determination unit 111 determines that there is no need for the feeding-speed abrupt change process, the speed command setting unit 112 sets the speed command $S_1$ to the speed command after change $(S_0+\Delta S_0)$, and the speed command $S_2$ to a value obtained by adding a steady-state additional value $\alpha$ to the speed command after change $(S_0+\Delta S_0)$. The steady-state additional value $\alpha$ is a value to be added in order to make the feeding speed of the feeder 31 greater than the feeding speed of the feeder 21 in the steady state. The steady-state additional value $\alpha$ is set to a value that makes the feeding speed of the feeder 31 greater than the feeding speed of the feeder 21 by several percent. The speed command setting unit 112 may change the steady-state additional value $\alpha$ based on the material, diameter, etc. of the welding wire B, or may change the said additional value $\alpha$ depending on whether it is during a welding operation or an inching operation. For example, when the welding wire B is made of aluminum and has a small diameter, the welding wire B is prone to buckle. Accordingly, the normal-state additional value is set relatively large. During inching, the feeding speed of the feeder 31 may momentarily decrease when the welding wire B reaches the feeder 31. In order to prevent buckling even in such a case, the steady-state additional value is set larger during inching than during welding.

When the condition determination unit 111 determines that it is necessary to perform the feeding-speed abrupt change process, the speed command setting unit 112 changes the speed command $S_1$ by a change value $\beta$ for each predetermined timing, until the speed command $S_1$ equals the changed speed command $(S_0+\Delta S_0)$. The speed command setting unit 112 also changes the speed command $S_2$ by the change value $\beta$ for each predetermined timing, until the speed command $S_2$ equals the value obtained by adding the steady-state additional value $\alpha$ to the changed speed command $(S_0+\Delta S_0)$. In the present embodiment, the speed command setting unit 112 changes the speed command $S_1$ and the speed command $S_2$ in, for example, 10 stages, during a predetermined change time period T (e.g., 100 milliseconds). In other words, the speed commands $S_1$ and $S_2$ are changed by the change value $\beta$ for each time period equivalent to 1/10 of the change time period T, so that the speed commands $S_1$ and $S_2$ are changed by $\Delta S_0$ after the change time period T has elapsed. The change value $\beta$ is used to gradually change the speed commands $S_1$ and $S_2$ over time. The change value $\beta$ is set to a positive value when the feeding speed increases, and to a negative value when the feeding speed decreases. When the speed commands $S_1$ and $S_2$ are changed in 10 stages, the change value $\beta$ is set to (1/10) $\Delta S_0$. The change time period T and the number of stages for change are not limited. The change time period T and the number of stages for change are appropriately set based on experiments and simulation results, so that the power supply unit 35 does not suffer from a voltage abnormality when the speed commands $S_1$ and $S_2$ are changed by the change value $\beta$ for each predetermined timing. The change time period T or the number of stages for change may be different depending on whether the feeding speed increases ($\Delta S_0 > 0$) or decreases ($\Delta S_0 < 0$). The rate of change of each of the speed commands $S_1$ and $S_2$ may correspond to either the feeder 21 or the feeder 31, whichever has a lower transient responsiveness.

The speed command $S_2$ is greater than the speed command $S_1$ by the steady-state additional value $\alpha$ at the start of the feeding-speed abrupt change process. Accordingly, the speed command $S_2$ is greater than the speed command $S_1$ by the steady-state additional value $\alpha$ both during and at the end of the feeding-speed abrupt change process. Note that the speed command setting unit 112 may use the speed command $S_2$ as a reference, and may set the speed command $S_1$ to have a value smaller than the speed command $S_2$ by the steady-state additional value $\alpha$. In other words, when, for example, the feeding-speed abrupt change process is not performed, the speed command setting unit 112 may set the speed command $S_1$ to a value obtained by subtracting the steady-state additional value $\alpha$ from the speed command after change $(S_0+\Delta S_0)$, and may set the speed command $S_2$ to the speed command after change $(S_0+\Delta S_0)$.

The speed command transmission unit 113 is a functional block for transmitting a speed command. The speed command transmission unit 113 transmits the speed command $S_1$ set by the speed command setting unit 112 to the control unit 22 of the wire feeding apparatus 2, and transmits the speed command $S_2$ to the control unit 32 of the welding torch 3. In practice, the speed command transmission unit 113 outputs the speed commands $S_1$ and $S_2$ to a communication unit (not shown), and causes the communication unit to transmit the speed commands $S_1$ and $S_2$.

Figure 4:
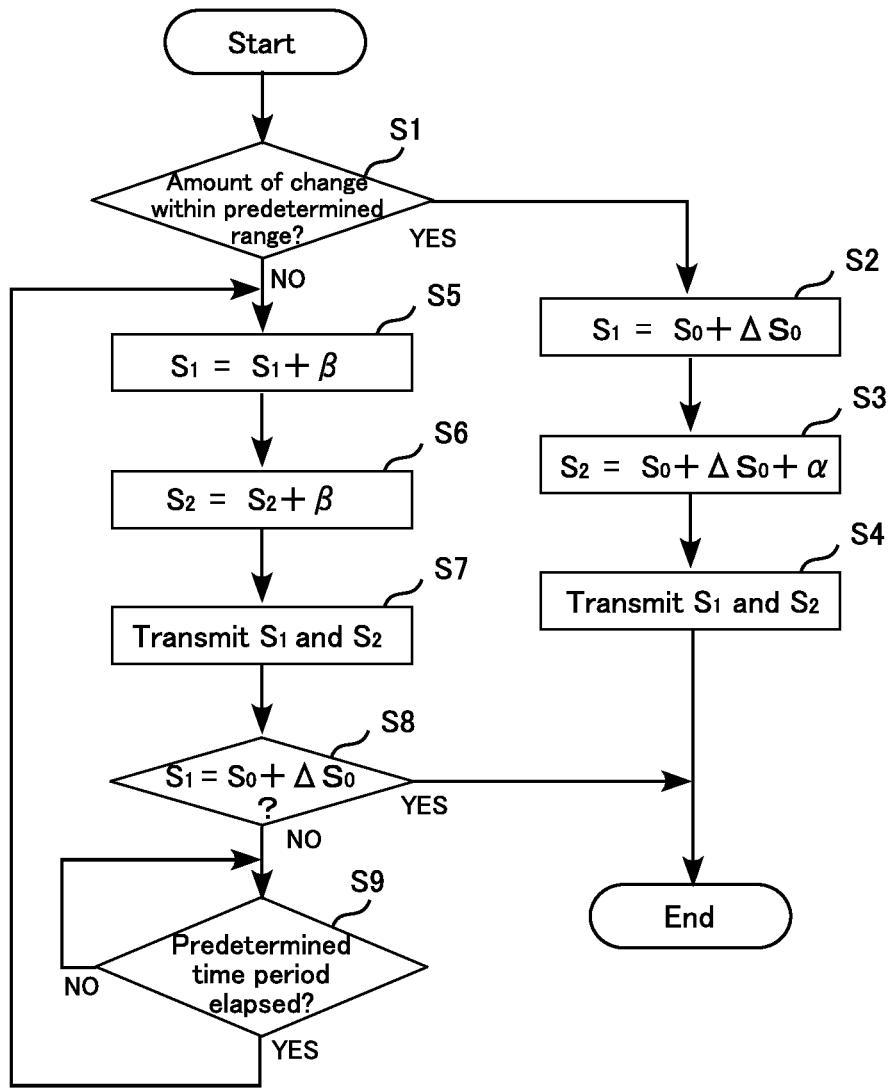
FIG. 4 is a flowchart for illustrating a feed control process in the welding system of FIG. 1.

FIG. 4 is a flowchart for illustrating a feed control process performed by the control unit 11. Sequences of changes in the welding voltage (welding current) at the time of welding and sequences of changes in the feeding speed of the welding wire B are stored in advance in a storage (not shown) as programs according to the types of welding and welding conditions. The control unit 11 reads the corresponding program according to the selected type of welding and the selected welding condition, and controls the welding voltage (welding current) and the feeding speed according to the program. The feeding speed is set for each of the periods such as a slowdown period, a hot start period, a steady feeding period, and an anti-stick period in a welding process (and may be changed within the period), and is changed when the current period transitions to the next. The feeding speed is also changed in a case such as when a welding condition is switched to another by an operator during a welding operation or when slowdown occurs due to an arc break process. The feed control process is performed when the feeding speed is changed in these cases as described above. The feed control process is also performed when the feeding speed is changed during inching.

First, the condition determination unit 111 determines whether the amount of change in the feeding speed is within a predetermined range (S1). Specifically, the condition determination unit 111 determines whether the amount of change $\Delta S_0$ of the speed command $S_0$, is within the range from the threshold value $\Delta Sth1$ to the threshold value $\Delta Sth2$.

When the amount of change is within the predetermined range, that is, when $\Delta Sth1 \leq \Delta S_0 \leq \Delta Sth2$ (S1: YES), there is no need for the feeding-speed abrupt change process. Accordingly, the speed command setting unit 112 sets the speed command $S_1$ to the speed command after change $(S_0+\Delta S_0)$ (S2), and the speed command $S_2$ to a value obtained by adding the steady-state additional value $\alpha$ to the speed command after change $(S_0+\Delta S_0)$ (S3). Then, the speed command transmission unit 113 transmits the speed command $S_1$ to the control unit 22 of the wire feeding apparatus 2, and transmits the speed command $S_2$ to the control unit 32 of the welding torch 3 (S4). Thereafter, the feed control process is terminated.

When the condition determination unit 111 determines that the amount of change is not within the predetermined range, that is, when $\Delta S_0 < \Delta Sth1$ or $\Delta S_0 > \Delta Sth2$ (S1: NO), the feeding-speed abrupt change process (steps S5 to S9) is performed.

At the start of the feeding-speed abrupt change process, the speed command setting unit 112 changes the speed command $S_1$ by a change value $\beta$ (S5), and changes the speed command $S_2$ by the change value $\beta$ (S6). Then, the speed command transmission unit 113 transmits the speed command $S_1$ to the control unit 22 of the wire feeding apparatus 2, and transmits the speed command $S_2$ to the control unit 32 of the welding torch 3 (S7).

Next, the control unit 11 determines whether the speed command $S_1$ equals the speed command after change $(S_0+\Delta S_0)$ (S8). When the speed command $S_1$ does not equal the speed command after change $(S_0+\Delta S_0)$ (S8: NO), the control unit 11 waits for a predetermined time period to elapse (S9), returns to step S5, and repeats steps S5 to S9. In the present embodiment, the speed command $S_1$ and the speed command $S_2$ are changed in 10 stages during the change time period T. Accordingly, the predetermined time period is $\frac{1}{10}$ of the change time period T. When the speed command $S_1$ equals the speed command after change $(S_0+\Delta S_0)$ in Step S8 (S8: YES), the feed control process is terminated.

The process shown in the flowchart of FIG. 4 is merely an example, and the feed control process performed by the control unit 11 is not limited to the process described above.

FIGS. 5A-E illustrate a result of simulating the state of the feeder 31 of the welding torch 3, when the feeding-speed abrupt change process is performed in the welding system A1. FIG. 5A shows a temporal change of the speed command $S_0$. FIG. 5B shows a temporal change of the speed command $S_2$. FIG. 5C shows a temporal change of the rotation frequency of the feeding motor 311. FIG. 5D shows a temporal change of the drive current flowing from the power supply unit 35. FIG. 5E shows a temporal change of the voltage of the power supply unit 35.

At time t0, the speed command $S_0$ decreases abruptly by the amount of change $\Delta S_0$ (<0) (See FIG. 5A). Since the amount of change $\Delta S_0$ is smaller than the threshold value $\Delta Sth1$, the feeding-speed abrupt change process is performed. Because of the process, the speed command $S_2$ gradually decreases over time during the change time period T between time t0 and time t1 (see FIG. 5B). In the present simulation, the number of stages for change is large enough for the value of the speed command $S_2$ to change slope-wise.

In this way, the rotation frequency of the feeding motor 311 decreases slope-wise according to the speed command $S_2$ until time t1 (see FIG. 5C).

At time t0, the value of the speed command $S_2$ does not change abruptly, but rather decreases gradually over the change time period T. Accordingly, the drive current flowing from the power supply unit 35 is almost zero (see FIG. 5D). The voltage of the power supply unit 35 does not decrease, but rather rise due to a regenerative current resulting from a decrease in the rotation frequency of the feeding motor 311 (see FIG. 5E).

The following describes the advantages of the welding system A1.

According to the present embodiment, when the condition determination unit 111 determines that the amount of change in the feeding speed is not within the predetermined range, the speed command setting unit 112 gradually changes the speed command $S_2$ over time rather than changing the speed command $S_2$ at once. This makes it possible to prevent a voltage drop of the power supply unit 35 when the feeding speed is changed. As a result, a voltage supplied to the PWM signal generator 321c (microcomputer) can be prevented from dropping.

According to the present embodiment, when the condition determination unit 111 determines that the amount of change in the feeding speed is not within the predetermined range, the speed command setting unit 112 also gradually changes the speed command $S_1$ over time rather than changing the speed command $S_1$ at once. Accordingly, even if a power supply unit (not shown) of the wire feeding apparatus 2 has the same structure as the power supply unit 35 of the welding torch 3, a voltage drop of the power supply unit can be prevented from dropping when the feeding speed is changed. Furthermore, since the speed command $S_1$ gradually changes in conjunction with the speed command $S_2$, the value of the speed command $S_1$ is prevented from increasing more rapidly than the value of the speed command $S_2$ when the feeding speed is changed. This prevents the feeding speed of the feeder 21 from exceeding the feeding speed of the feeder 31, thus suppressing buckling of the welding wire B. Furthermore, during the feeding-speed abrupt change process, the rate of change of each of the speed commands $S_1$ and $S_2$ is set so as to correspond to either the feeder 21 or the feeder 31, whichever has a lower transient responsiveness. In this way, a difference in feeding speeds caused as a result of a difference in transient responsiveness can be minimized to prevent occurrence of buckling.

According to the present embodiment, when the condition determination unit 111 determines that the amount of change in the feeding speed is within the predetermined range, the speed command setting unit 112 does not perform the feeding-speed abrupt change process. When the absolute value of the amount of change in the feeding speed is small, the rotation speed of the feeding motor 311 does not need to change abruptly. Because of this, a voltage drop of the power supply unit 35 is not significant. Accordingly, there is no need for the feeding-speed abrupt change process. In such a case, the present embodiment can prevent the unnecessary feeding-speed abrupt change process from being performed.

According to the present embodiment, the control unit 11 performs control so that the feeding speed of the feeder 31 is greater than the feeding speed of the feeder 21 by several percent. In this way, tension is applied to the welding wire B, thus suppressing the feed resistance of the welding wire B and preventing buckling of the welding wire B. According to the present embodiment, the feeding motor 311 has a smaller output than the feeding motor 211, and the pressure roll 313 has a smaller pressure force than the pressure roll 213. Accordingly, the welding wire B is likely to slip against the feeding roll 312 and the pressure roll 313. This makes it possible to apply tension to the welding wire B while reducing the load on the feeding motor 311.

In the present embodiment, the speed command $S_2$ is changed in 10 stages over the change time period T during the feeding-speed abrupt change process. However, the number of stages is not limited to such. The speed command setting unit 112 may change the speed command $S_2$ in a larger number of stages or in a smaller number of stages. Furthermore, the speed command setting unit 112 may change the speed command $S_2$ slope-wise. In the case of decreasing the value of the speed command $S_2$ slope-wise, the speed command setting unit 112 may set the number of stages for decreasing the value of the speed command $S_2$ to a large number (e.g., 100 stages) so that the speed command $S_2$ changes in a pseudo slope-like fashion, or may use an equation $S_2 = S_0 + \alpha + (\Delta S_0/T) \cdot t$ to linearly change the speed command $S_2$ according to time t.

In the present embodiment, the speed command $S_2$ is set to have a larger value than the speed command $S_1$ in the steady state by adding the steady-state additional value $\alpha$. However, the present disclosure is not limited to this. The speed command setting unit 112 may multiply the speed command $S_2$ by a predetermined value (e.g., 1.03), so that the speed command $S_2$ has a larger value than the speed command $S_1$ in the steady state.

In the present embodiment, the speed command setting unit 112 gradually changes the speed command $S_1$ in conjunction with the speed command $S_2$ during the feeding-speed abrupt change process. However, the present disclosure is not limited to this. For example, the speed command setting unit 112 may not gradually change the speed command $S_1$ when the power supply unit of the wire feeding apparatus 2 has sufficient capacity, or when power supply systems are separately provided for driving the motors and for driving the microcomputers. In this case, when the feeding speed is increased, the speed command $S_1$ becomes larger in value than the speed command $S_2$ in a certain period. If this raises the possibility of buckling, then the speed command $S_1$ may be gradually changed in conjunction with the speed command $S_2$ only when the feeding speed is increased. In the case of decreasing the feeding speed, even if the value of the speed command $S_2$ is gradually decreased and the value of the speed command $S_1$ is abruptly decreased, buckling is less likely to occur since the speed command $S_2$ has a larger value than the speed command $S_1$.

Second Embodiment

Figure 6:
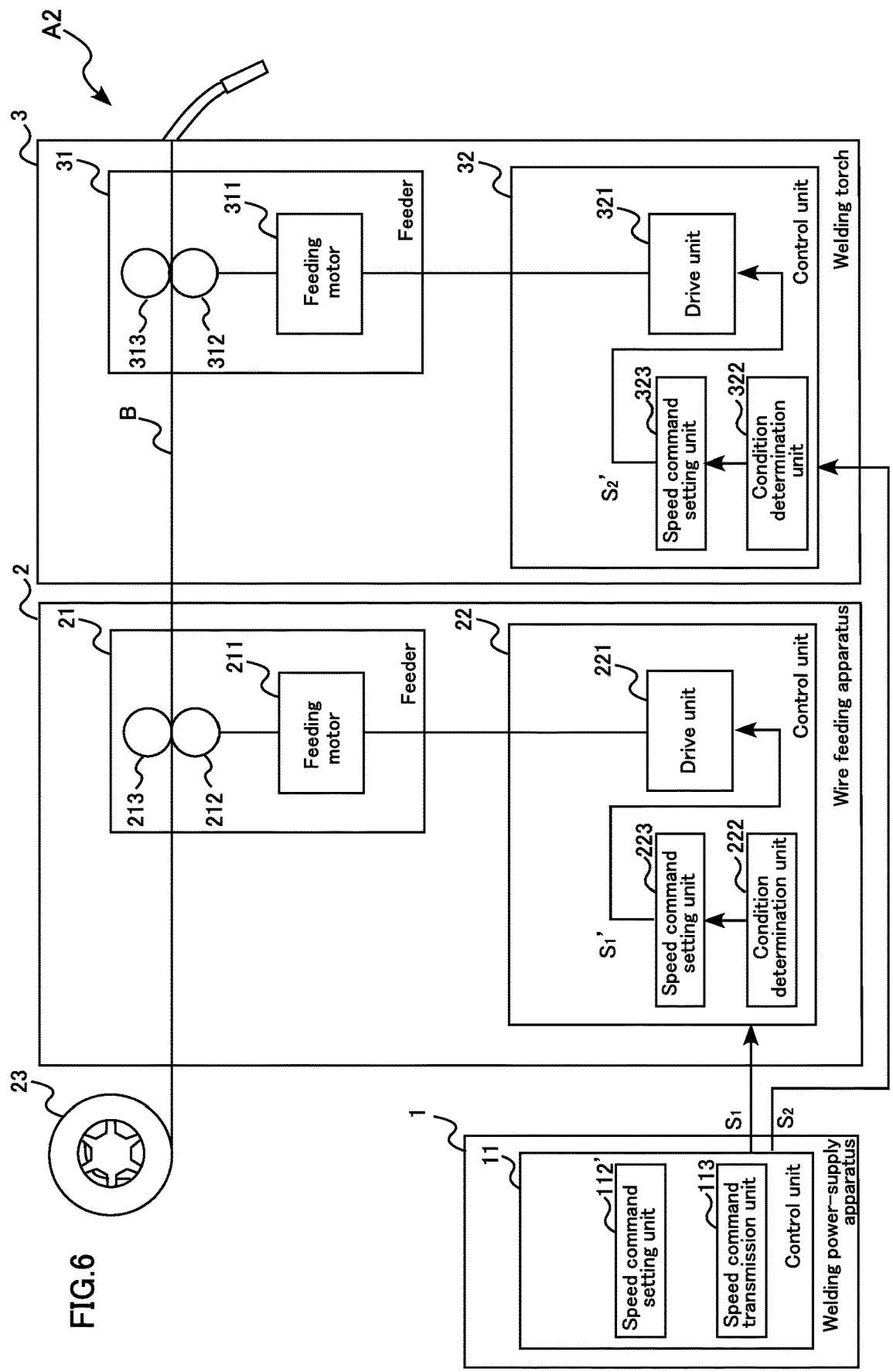
FIG. 6 is a block diagram showing a functional structure of a welding system according to a second embodiment.

FIGS. 6 and 7 illustrate a welding system A2 according to a second embodiment. FIG. 6 is a block diagram showing a functional structure of the welding system A2. In FIG. 6, elements that are the same as or similar to the elements of the welding system A1 (see FIG. 2) are provided with the same reference signs, and descriptions thereof are omitted. FIG. 7 is a flowchart for illustrating a feed control process in the welding system A2. A schematic diagram showing an overall structure of the welding system A2 is the same as in the first embodiment (see FIG. 1). Accordingly, descriptions of the overall structure of the welding system A2 are omitted.

The welding system A2 differs from the welding system A1 in that instead of the control unit 11, the control unit 22 and the control unit 32 each include a functional structure for the feeding-speed abrupt change process.

According to the second embodiment, the control unit 11 does not include the condition determination unit 111 as an internal configuration for the feed control, and includes a speed command setting unit 112' having a function different from the speed command setting unit 112 according to the first embodiment. Upon receiving an instruction on a change in the feeding speed, the speed command setting unit 112' sets the speed command $S_1$ and the speed command $S_2$ based on the speed command $(S_0 + \Delta S_0)$ according to the feeding speed after change. Specifically, the speed command setting unit 112' sets the speed command $S_1$ to the changed speed command $(S_0 + \Delta S_0)$, and the speed command $S_2$ to the changed speed command $(S_0 + \Delta S_0)$. The speed command transmission unit 113 transmits the speed command $S_1$ to the control unit 22 of the wire feeding apparatus 2, and transmits the speed command $S_2$ to the control unit 32 of the welding torch 3. Note that the speed command setting unit 112' may set the speed command $S_2$ to a value obtained by adding a steady-state additional value $\alpha$ to the speed command after change $(S_0 + \Delta S_0)$. In this case, a speed command setting unit 323 described below does not add the steady-state additional value $\alpha$.

According to the second embodiment, the control unit 32 includes a condition determination unit 322 and a speed command setting unit 323 as internal configurations for the feed control.

The condition determination unit 322 is a functional block similar to the condition determination unit 111 according to the first embodiment. The condition determination unit 322 determines whether to perform the feeding-speed abrupt change process based on the speed command $S_2$ received from the control unit 11 and a speed command $S_2'$ inside the welding torch 3. The speed command $S_2'$ is a speed command before the speed command $S_2$ is input from the control unit 11. The condition determination unit 322 determines whether an amount of change $\Delta S_2 (= S_2 + \alpha - S_2')$ of the speed command $S_2$ is within a predetermined range. As described below, the speed command $S_2'$ is set by adding the steady-state additional value $\alpha$ to the speed command $S_2$. Accordingly, calculation of the amount of change $\Delta S_2$ involves addition of the steady-state additional value $\alpha$. Specifically, the condition determination unit 322 determines whether the amount of change $\Delta S_2$ is within the range from a threshold value $\Delta S_2 th1$ to a threshold value $\Delta S_2 th2$ $(> \Delta S_2 th1)$. The threshold values $\Delta S_2 th1$ and $\Delta S_2 th2$ are not limited. When determining that the amount of change $\Delta S_2$ of the speed command $S_2$ is not within the predetermined range (not within the range from the threshold value $\Delta S_2 th1$ to the threshold value $\Delta S_2 th2$), the condition determination unit 322 determines that it is necessary to perform the feeding-speed abrupt change process. When determining that the amount of change $\Delta S_2$ of the speed command $S_2$ is within the predetermined range (within the range from the threshold value $\Delta S_2 th1$ to the threshold value $\Delta S_2 th2$), the condition determination unit 322 determines that there is no need for the feeding-speed abrupt change process. The condition determination unit 322 outputs the determination result to the speed command setting unit 323.

The speed command setting unit 323 is a functional block similar to the speed command setting unit 112 according to the first embodiment. The speed command setting unit 323 sets the speed command $S_2'$ inside the welding torch 3, based on the speed command $S_2$ received from the control unit 11 and the determination result received from the condition determination unit 322. Specifically, when determining that the condition determination unit 322 does not need to perform the feeding-speed abrupt change process, the speed command setting unit 323 sets the speed command $S_2'$ by adding the steady-state additional value α to the speed command $S_2$. The steady-state additional value α is the same as the steady-state additional value α according to the first embodiment. When the condition determination unit 322 determines that it is necessary to perform the feeding-speed abrupt change process, the speed command setting unit 323 changes the speed command $S_2'$ by a change value β for each predetermined timing, until the speed command $S_2'$ equals a value obtained by adding the steady-state additional value α to the speed command $S_2$. The change value β is the same as the change value β according to the first embodiment. In the present embodiment, the speed command setting unit 323 changes the speed command $S_2'$ in, for example, 10 stages, during a predetermined change time period T (e.g., 100 milliseconds). In other words, the speed command $S_2'$ is changed by the change value β for each time period equivalent to 1/10 of the change time period T, so that the speed command $S_2'$ is changed by $\Delta S_0$ after the change time period T has elapsed.

According to the second embodiment, the control unit 22 includes a condition determination unit 222 and a speed command setting unit 223 as internal configurations for the feed control.

The condition determination unit 222 is a functional block similar to the condition determination unit 322. The condition determination unit 222 determines whether to perform the feeding-speed abrupt change process based on the speed command $S_1$ received from the control unit 11 and a speed command $S_1'$ inside the wire feeding apparatus 2. The speed command $S_1'$ is a speed command before the speed command $S_1$ is input from the control unit 11. The condition determination unit 222 determines whether an amount of change $\Delta S_1 (=S_1-S_1')$ of the speed command $S_1$ is within a predetermined range. Specifically, the condition determination unit 222 determines whether the amount of change $\Delta S_1$ is within the range from a threshold value $\Delta S_1 th1$ to a threshold value $\Delta S_1 th2$ ($>\Delta S_1 th1$). The threshold values $\Delta S_1 th1$ and $\Delta S_1 th2$ are not limited. When determining that the amount of change $\Delta S_1$ of the speed command $S_1$ is not within the predetermined range (not within the range from the threshold value $\Delta S_1 th1$ to the threshold value $\Delta S_1 th2$), the condition determination unit 222 determines that it is necessary to perform the feeding-speed abrupt change process. When determining that the amount of change $\Delta S_1$ of the speed command $S_1$ is within the predetermined range (within the range from the threshold value $\Delta S_1 th1$ to the threshold value $\Delta S_1 th2$), the condition determination unit 222 determines that there is no need for the feeding-speed abrupt change process. The condition determination unit 222 outputs the determination result to the speed command setting unit 223. Note that the amount of change $\Delta S_2$ equals the amount of change $\Delta S_1$. In order for the determination by the condition determination unit 222 to be consistent with the determination by the condition determination unit 322, the threshold value $\Delta S_1 th1$ equals the threshold value $\Delta S_2 th1$, and the threshold value $\Delta S_1 th2$ equals the threshold value $\Delta S_2 th2$.

The speed command setting unit 223 is a functional block similar to the speed command setting unit 323. The speed command setting unit 223 sets the speed command $S_1'$ inside the wire feeding apparatus 2, based on the speed command $S_1$ received from the control unit 11 and the determination result received from the condition determination unit 222. Specifically, when determining that the condition determination unit 222 does not need to perform the feeding-speed abrupt change process, the speed command setting unit 223 sets the speed command $S_1'$ to the speed command $S_1$. When the condition determination unit 222 determines that it is necessary to perform the feeding-speed abrupt change process, the speed command setting unit 223 changes the speed command $S_1'$ by a change value β for each predetermined timing, until the speed command $S_1'$ equals the speed command $S_1$. In the present embodiment, the change time period T and the number of stages for change are matched with those in the speed command setting unit 323, in order to associate the speed command $S_1'$ with the speed command $S_2'$. However, the change time period T and the number of stages for change do not always need to be matched with those in the speed command setting unit 323. At the start of the feeding-speed abrupt change process, the speed command $S_2'$ is larger than the speed command $S_1'$ by the steady-state additional value α. Accordingly, when the speed command $S_1'$ is associated with the speed command $S_2'$ the speed command $S_2'$ is larger than the speed command $S_1'$ by the steady-state additional value α both during and at the end of the feeding-speed abrupt change process.

Figure 7A:
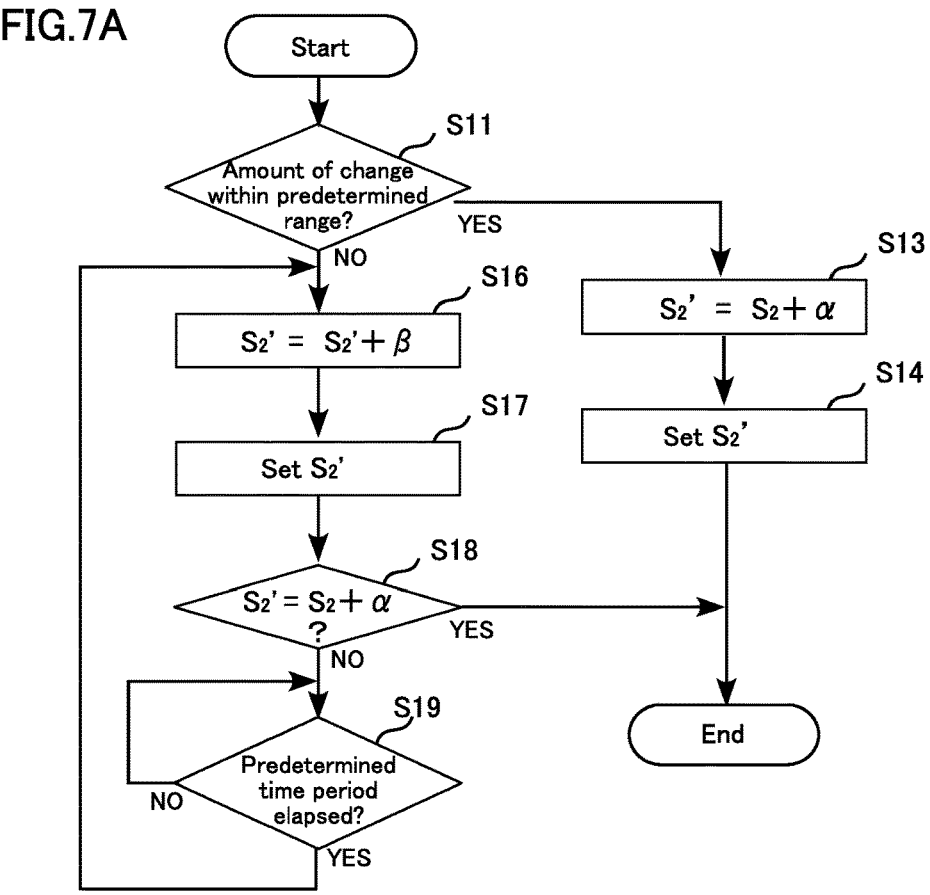
FIGS. 7A and 7B are flowcharts for illustrating a feed control process according to the welding system of FIG. 6.

FIG. 7A is a flowchart for illustrating a feed control process performed by the control unit 32. The feed control process is performed when the speed command $S_2$ is input from the control unit 11.

First, the condition determination unit 322 determines whether the amount of change in the feeding speed is within a predetermined range (S11). Specifically, the condition determination unit 322 determines whether the amount of change $\Delta S_7$ of the speed command $S_2$ is within the range from the threshold value $\Delta S_2 th1$ to the threshold value $\Delta S_2 th2$.

When the amount of change is within the predetermined range, that is, when $\Delta S_2 th1 \leq \Delta S_2 \leq \Delta S_2 th2$ (S11: YES), there is no need for the feeding-speed abrupt change process. Accordingly, the speed command setting unit 323 calculates the speed command $S_2'$ by adding the steady-state additional value α to the speed command $S_2$ (S13), and sets the resultant value as the speed command $S_2'$ (S14). Thereafter, the feed control process is terminated.

When the condition determination unit 322 determines that the amount of change is not within the predetermined range, that is, when $\Delta S_2 < \Delta S_2 th1$ or $\Delta S_2 > \Delta S_2 th2$ (S11: NO), the feeding-speed abrupt change process (steps S16 to S19) is performed.

At the start of the feeding-speed abrupt change process, the speed command setting unit 323 changes the speed command $S_2'$ by a change value β (S16), and sets the resultant value as the speed command $S_2'$ (S17). Next, the control unit 32 determines whether the speed command $S_2'$ equals a value (i.e., a steady-state command value) obtained by adding the steady-state additional value α to the speed command $S_2$ (S18). When the speed command $S_2'$ does not equal the steady-state command value (S18: NO), the control unit 32 waits for a predetermined time period to elapse (S19), returns to step S16, and repeats steps S16 to S19. When the speed command $S_2'$ equals the steady-state command value in step S18 (S18: YES), the feed control process is terminated.

Figure 7B:
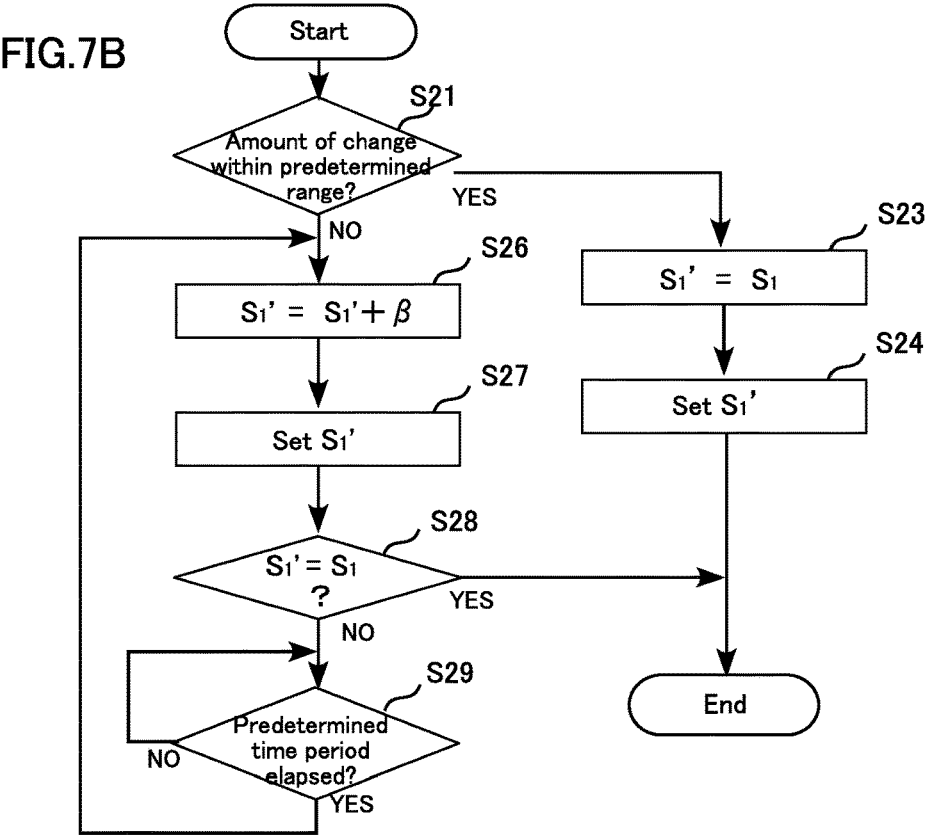

FIG. 7B is a flowchart for illustrating a feed control process performed by the control unit 22. The feed control process is performed when the speed command $S_1$ is input from the control unit 11.

First, the condition determination unit 222 determines whether the amount of change in the feeding speed is within a predetermined range (S21). Specifically, the condition determination unit 222 determines whether the amount of change $\Delta S_1$ of the speed command $S_1$ is within the range from the threshold value $\Delta S_1 th1$ to the threshold value $\Delta S_1 th2$.

When the amount of change is within the predetermined range, that is, when $\Delta S_1 th1 \leq \Delta S_1 \leq \Delta S_1 th2$ (S21: YES), there is no need for the feeding-speed abrupt change process. Accordingly, the speed command setting unit 223 inputs (S23) and sets (S24) the speed command $S_1$ as the speed command $S_1'$. Thereafter, the feed control process is terminated.

When the condition determination unit 222 determines that the amount of change is not within the predetermined range, that is, when $\Delta S_1 < \Delta S_1 th1$ or $\Delta S_1 > \Delta S_1 th2$ (S21: NO), the feeding-speed abrupt change process (steps S26 to S29) is performed.

At the start of the feeding-speed abrupt change process, the speed command setting unit 223 changes the speed command $S_1'$ by a change value β (S26), and sets the resultant value as the speed command $S_1'$ (S27). Next, the control unit 22 determines whether the speed command $S_1'$ equals the speed command $S_1$ (S28). When the speed command $S_1'$ does not equal the speed command $S_1$ (S28: NO), the control unit 22 waits for a predetermined time period to elapse (S29), returns to step S26, and repeats steps S26 to S29. When the speed command $S_1'$ equals the speed command $S_1$ in step S28 (S28: YES), the feed control process is terminated.

The processes shown in the flowcharts of FIGS. 7A and 7B are merely examples, and the feed control processes performed by the control units 32 and 22 are not limited to the processes described above.

The present embodiment can produce the same advantageous effect as the first embodiment. Note that the speed command $S_1'$ does not need to be gradually changed when the power supply unit of the wire feeding apparatus 2 has sufficient capacity, or when power supply systems are separately provided for driving the motors and for driving the microcomputers. In this case, the control unit 22 of the wire feeding apparatus 2 may not include the condition determination unit 222 or the speed command setting unit 223, and may directly set the speed command $S_1$ received from the control unit 11 as the speed command $S_1'$ without any changes. In this case, when the feeding speed is increased, the speed command $S_1'$ becomes larger in value than the speed command $S_2'$ in a certain period. If this raises the possibility of buckling, then the speed command $S_1'$ may be gradually changed in conjunction with the speed command $S_2'$ only when the feeding speed is increased. In the case of decreasing the feeding speed, even if the value of the speed command $S_2'$ is gradually decreased and the value of the speed command $S_1'$ is abruptly decreased, buckling is less likely to occur since the speed command $S_2'$ has a larger value than the speed command $S_1'$.

Third Embodiment

Figure 9:
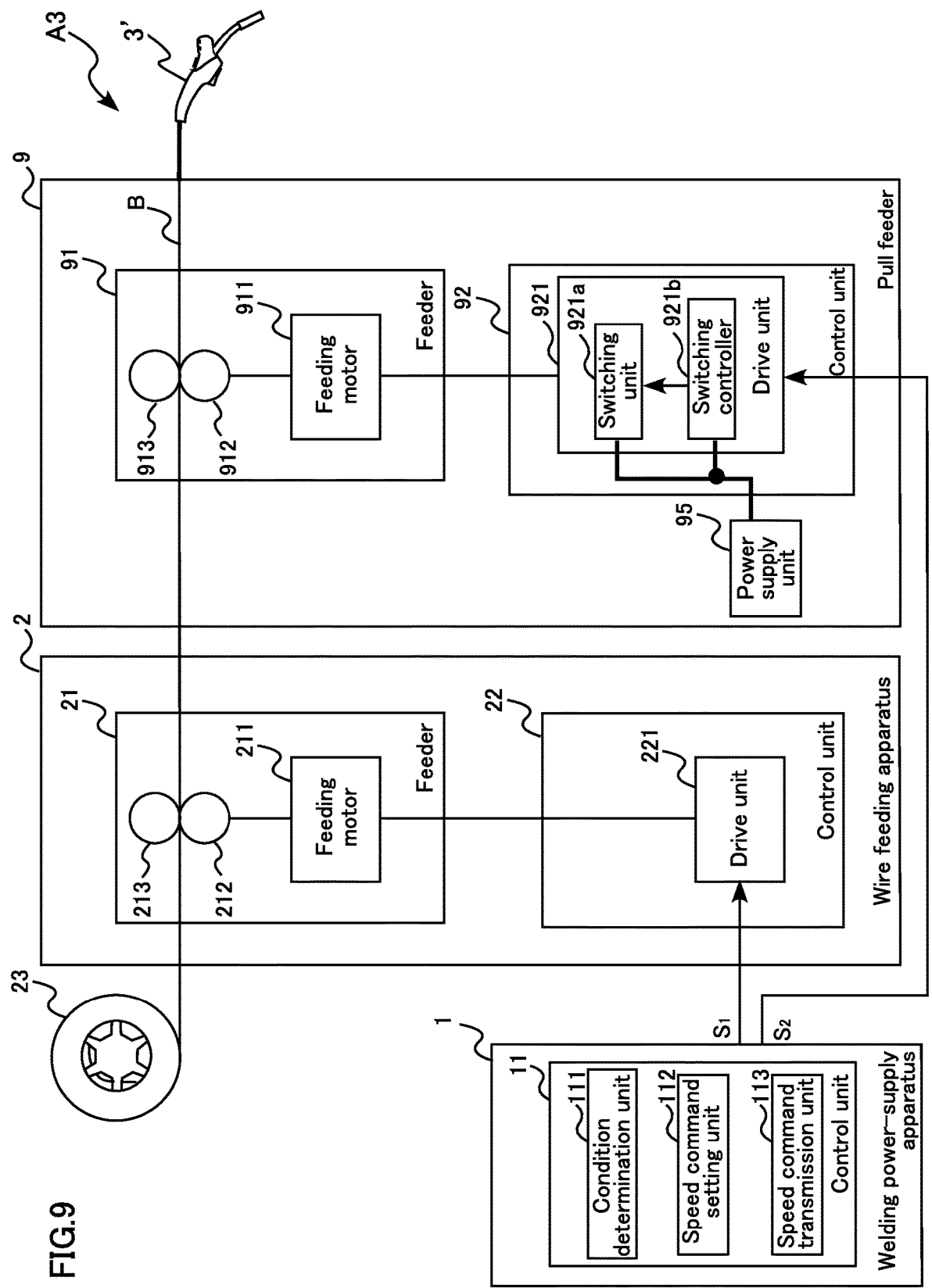
FIG. 9 is a block diagram showing a functional structure of the welding system of FIG. 8.

FIGS. 8 and 9 illustrate a welding system A3 according to a third embodiment. FIG. 8 is a schematic diagram showing an overall structure of the welding system A3. FIG. 9 is a block diagram showing a functional structure of the welding system A3. In these figures, elements that are the same as or similar to the elements of the welding system A1 (see FIGS. 1 and 2) are provided with the same reference signs, and descriptions thereof are omitted. In FIG. 9, a description of the internal configuration of a welding torch 3' is omitted.

The welding system A3 is different from the welding system A1 in that the welding torch 3' does not function as a pull-side feeding apparatus, and in that the welding system A3 further includes a pull feeder 9 that serves as the pull-side feeding apparatus instead.

The welding torch 3' is the same as the welding torch 3 according to the first embodiment (see FIG. 2), except that the welding torch 3' does not include the feeder 31 or the drive unit 321. In other words, the welding torch 3' has the same functions as the welding torch 3, except that the welding torch 3' does not have a function of feeding the welding wire B.

The pull feeder 9 feeds the welding wire B, and reduces the feed resistance of the welding wire B by pulling the welding wire B and applying tension. As shown in FIG. 8, the pull feeder 9 is provided on the feeding path of the welding wire B between the wire feeding apparatus 2 and the welding torch 3', and is positioned closer to the welding torch 3'. Specifically, the pull feeder 9 is connected to the wire feeding apparatus 2 by the torch cable 39. The pull feeder 9 is also connected to the welding torch 3' by a torch cable 39' having the same structure as the torch cable 39. The torch cable 39 may have a length of approximately several tens of meters, whereas the torch cable 39' has a length of approximately several meters. The pull feeder 9 and the wire feeding apparatus 2 communicate with each other via the communication line (not shown) inside the torch cable 39. The pull feeder 9 and the welding torch 3' communicate with each other via a communication line (not shown) inside the torch cable 39'. The pull feeder 9 and the welding Power-supply apparatus 1 communicate with each other via the wire feeding apparatus 2. Note that the pull feeder 9 and the welding power-supply apparatus 1 may directly communicate with each other. The method for communication is not limited. Also, the welding power-supply apparatus 1, the wire feeding apparatus 2, and the pull feeder 9 may exchange information via a control line using voltage and current levels and pulses. The pull feeder 9 is supplied with power from the wire feeding apparatus 2 via the power transmission line (not shown) inside the torch cable 39. The pull feeder 9 may be supplied with power directly from the welding power-supply apparatus 1, or may be supplied with power from an apparatus other than the welding power-supply apparatus 1 or the wire feeding apparatus 2. As shown in FIG. 9, the pull feeder 9 includes a feeder 91, a control unit 92, and a power supply unit 95. The pull feeder 9 may further include units such as an operation unit and a display unit.

The feeder 91 is configured to be driven by a drive signal received from the control unit 92, and to pull the welding wire B. The feeder 91 includes a feeding motor 911, a feeding roll 912, and a pressure roll 913.

The feeding motor 911 generates a drive force for feeding the welding wire B. The feeding motor 911 is driven by a drive signal received from the control unit 92 (from a drive unit 921 described below). The feeding motor 911 is a brushless motor, for example, and its rotation speed is controlled by adjusting the drive signal. The control unit 92 (the drive unit 921 described below) controls the rotation speed of the feeding motor 911 by adjusting the pulse width of the drive signal by pulse width modulation, for example. The feeding motor 911 is relatively small to reduce the size and weight of the pull feeder 9, and is smaller than the feeding motor 211 of the wire feeding apparatus 2. The feeding motor 911 has a smaller output than the feeding motor 211.

The feeding roll 912 is attached to a rotary shaft of the feeding motor 911, and rotates with torque generated and transmitted by the feeding motor 911. The method for transmitting the torque of the feeding motor 911 to the feeding roll 912 is not limited. The welding wire B is in contact with the feeding roll 912, and the torque of the feeding roll 912 is converted into a tangential force for pulling the welding wire B. Accordingly, the welding wire B is pulled when the feeding motor 911 is driven.

The pressure roll 913 faces the feeding roll 912 with the welding wire B therebetween, and presses the welding wire B toward the feeding roll 912. This causes the welding wire B to be fed according to the rotation of the feeding roll 912. The pressure force of the pressure roll 913 is set smaller than the pressure force of the pressure roll 213 of the feeder 21.

The control unit 92 is implemented by a microcomputer, for example, and controls the pull feeder 9. The control unit 92 also causes the feeder 91 to be driven so as to feed the welding wire B, based on a command from the control unit 11 of the welding power-supply apparatus 1. The control unit 92 includes a drive unit 921.

The drive unit 921 controls drive of the feeder 91 and thereby controls feeding of the welding wire B. The drive unit 921 outputs a drive signal to the feeding motor 911 of the feeder 91, based on the speed command $S_2$ received from the control unit 11 of the welding power-supply apparatus 1. The drive unit 921 includes a switching unit 921a and a switching controller 921b. The switching unit 921a and the switching controller 921b are similar to the switching unit 321a and the switching controller 321b according to the first embodiment. The feeding motor 911 has an encoder (not shown) attached thereto, and the switching controller 921b detects the rotation speed of the feeding motor 911 from a pulse signal received from the encoder. In the present embodiment, the encoder is a magnetic encoder that is relatively small to reduce the size and weight of the pull feeder 9. Note that the encoder is not particularly limited, and may be an optical encoder instead. The switching controller 921b performs feedback control by adjusting the drive signal so that the detected rotation speed of the feeding motor 911 coincides with the rotation speed corresponding to the speed command $S_2$. The method for detecting the rotation speed is not particularly limited. The switching controller 921b includes a PWM signal generator and a switch drive unit, which are not shown. The PWM signal generator and the switch drive unit are similar to the PWM signal generator 321c and the switch drive unit 321d according to the first embodiment.

The power supply unit 95 is similar to the power supply unit 35 according to the first embodiment. The power supply unit 95 is supplied with power from a power supply unit (not shown) in the wire feeding apparatus 2 via a power transmission line (not shown), and supplies power to each unit of the pull feeder 9. The power supply unit 95 may be supplied with power directly from the welding power-supply apparatus 1, or may be supplied with power from an apparatus other than the welding power-supply apparatus 1 or the wire feeding apparatus 2. In the present embodiment, the power supply unit 95 is supplied with a voltage of 48 V, for example, stores power in a capacitor (not shown), and supplies an inter-terminal voltage of 48 V of the capacitor to the switching unit 921a. The power supply unit 95 decreases an inter-terminal voltage of 48 V of the capacitor to 16 V, for example, and supplies the voltage to the switch drive unit. The power supply unit 95 also decreases a voltage of 16 V to 5 V, for example, and supplies the voltage to the PWM signal generator.

According to the present embodiment, when the condition determination unit 111 determines that the amount of change in the feeding speed is not within the predetermined range, the speed command setting unit 112 gradually changes the speed command $S_2$ over time rather than changing the speed command $S_2$ at once. This makes it possible to prevent a voltage drop of the power supply unit 95 when the feeding speed is changed.

As a result, a voltage supplied to the PWM signal generator (microcomputer) can be prevented from dropping. The present embodiment can produce the same advantageous effect as the first embodiment. Furthermore, the present embodiment can reduce the size and weight of the welding torch 3' since the welding torch 3' does not need to include any configurations for feeding the welding wire B. Note that in the present embodiment, the welding torch 3' may not include the control unit 32, and the control unit 92 of the pull feeder 9 may control the display unit 34 and the operation unit 33 of the welding torch 3'. This contributes to a further reduction in the size of the welding torch 3'.

Fourth Embodiment

Figure 10:
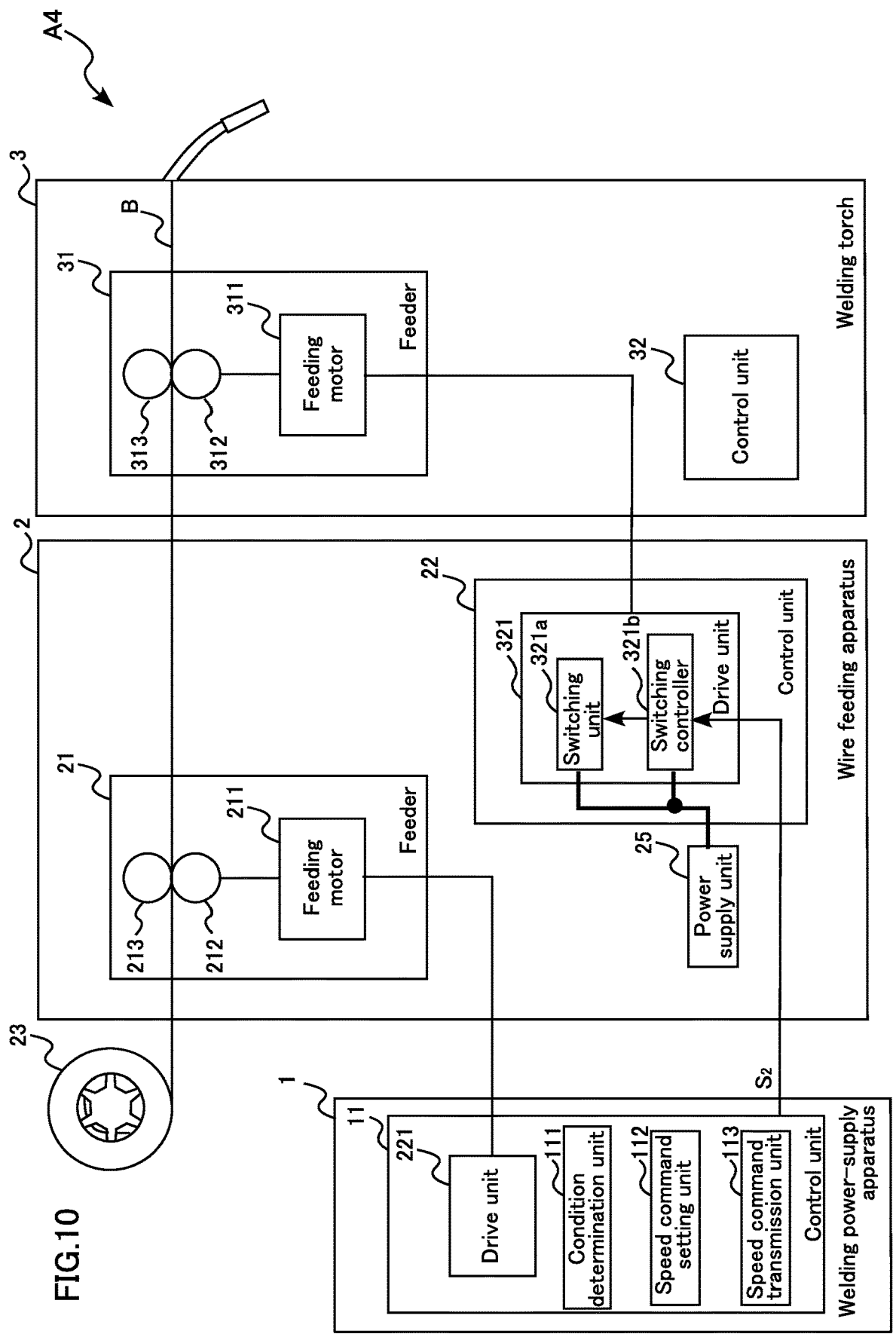
FIG. 10 is a block diagram showing a functional structure of a welding system according to a fourth embodiment.

FIG. 10 is a block diagram showing a functional structure of a welding system A4 according to a fourth embodiment. In FIG. 10, elements that are the same as or similar to the elements of the welding system A1 (see FIG. 2) are provided with the same reference signs, and descriptions thereof are omitted. In FIG. 10, a description of a part of the internal configuration of the welding torch 3 is omitted.

The welding system A4 is different from the welding system A1 in that the control unit 11 includes the drive unit 221, and the control unit 22 includes the drive unit 321.

The drive unit 221 receives the speed command $S_1$ set by the speed command setting unit 112, and outputs a drive signal to the feeding motor 211 of the feeder 21 based on the speed command $S_1$. In other words, the welding power-supply apparatus 1 controls the rotation speed of the feeding motor 211 by adjusting the drive signal transmitted to the feeding motor 211. The drive unit 321 outputs a drive signal to the feeding motor 311 of the feeder 31, based on the speed command $S_2$ received from the speed command transmission unit 113. In other words, the welding power-supply apparatus 2 controls the rotation speed of the feeding motor 311 by adjusting the drive signal transmitted to the feeding motor 311.

A power supply unit 25 is similar to the power supply unit 35 according to the first embodiment. The power supply unit 25 is supplied with power from a power supply unit (not shown) in the welding power-supply apparatus 1 via a power transmission line (not shown), and supplies power to each unit of the wire feeding apparatus 2. The power supply unit 25 may be supplied with power from an apparatus other than the welding power-supply apparatus 1. In the present embodiment, the power supply unit 25 is supplied with a voltage of 48 V, for example, stores power in a capacitor (not shown), and supplies an inter-terminal voltage of 48 V of the capacitor to the switching unit 321a. The power supply unit 25 decreases an inter-terminal voltage of 48 V of the capacitor to 16 V, for example, and supplies the voltage to the switch drive unit 321d (switching controller 321b). The power supply unit 25 also decreases a voltage of 16 V to 5 V, for example, and supplies the voltage to the PWM signal generator 321c (switching controller 321b).

According to the present embodiment, when the condition determination unit 111 determines that the amount of change in the feeding speed is not within the predetermined range, the speed command setting unit 112 gradually changes the speed command $S_2$ over time rather than changing the speed command $S_2$ at once. This makes it possible to prevent a voltage drop of the power supply unit 25 when the feeding speed is changed. As a result, a voltage supplied to the PWM signal generator 321c (microcomputer) can be prevented from dropping. The present embodiment can produce the same advantageous effect as the first embodiment. Furthermore, according to the present embodiment, the welding torch 3 does not include the drive unit 321, thus allowing for a reduction in the size of the welding torch 3. Note that in the present embodiment, the welding torch 3 may not include the control unit 32, and the control unit 22 of the wire feeding apparatus 2 may control the display unit 34 and the operation unit 33 of the welding torch 3. This contributes to a further reduction in the size of the welding torch 3.

Fifth Embodiment

Figure 11:
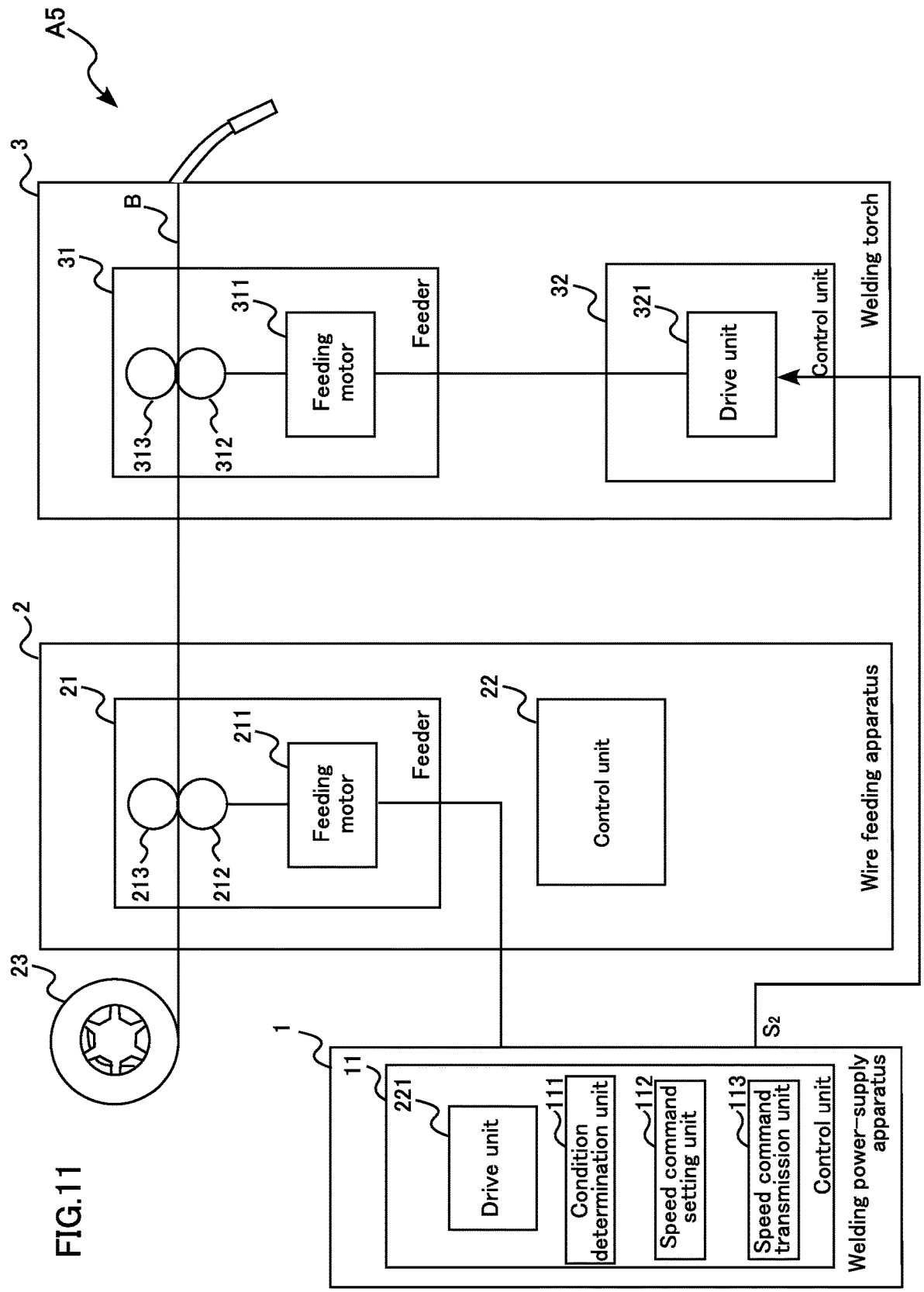
FIG. 11 is a block diagram showing a functional structure of a welding system according to a fifth embodiment.

FIG. 11 is a block diagram showing a functional structure of a welding system A5 according to a fifth embodiment. In FIG. 11, elements that are the same as or similar to the elements of the welding system A1 (see FIG. 2) are provided with the same reference signs, and descriptions thereof are omitted. In FIG. 11, a description of a part of the internal configuration of the welding torch 3 is omitted.

The welding system A5 is different from the welding system A1 in that the control unit 11 includes the drive unit 221. The drive unit 221 receives the speed command $S_1$ set by the speed command setting unit 112, and outputs a drive signal to the feeding motor 211 of the feeder 21 based on the speed command $S_1$. In other words, the welding power-supply apparatus controls the rotation speed of the feeding motor 211 by adjusting the drive signal transmitted to the feeding motor 211.

The present embodiment can produce the same advantageous effect as the first embodiment. Furthermore, according to the present embodiment, the wire feeding apparatus 2 does not include the drive unit 221, thus allowing for a reduction in the size of the wire feeding apparatus 2. Note that in the present embodiment, the wire feeding apparatus 2 may not include the control unit 22 for controlling an operation unit and a display unit. This contributes to a further reduction in the size of the wire feeding apparatus 2.

The drive unit 221 and the drive unit 321 may be arranged in any suitable locations. For example, the control unit 11 of the welding power-supply apparatus 1 may include the drive unit 221 and the drive unit 321. In other words, the welding power-supply apparatus 1 may control the rotation speeds of the feeding motors 211 and 311 by adjusting the drive signals transmitted to the feeding motors 211 and 311.

In the first to fifth embodiments described above, the welding systems A1 to A5 feed the welding wire B. However, the present disclosure is not limited to such. The present disclosure is applicable to a wire feeding system for feeding a wire other than the welding wire B. For example, the present disclosure can be applied to a wire feeding system for feeding a thermal spraying wire during thermal spraying, and to a wire feeding system for feeding a brazing wire during brazing.

The wire feeding system and the welding system according to the present disclosure are not limited to the foregoing embodiments. Various design changes can be made to the specific structures of the elements of the wire feeding system and the welding system according to the present disclosure.

The invention claimed is:

1. A wire feeding system comprising:
a first feeder provided with a first feeding motor that feeds a wire in a wire feeding direction;
a second feeder spaced apart from the first feeder in the wire feeding direction and provided with a second feeding motor that feeds the wire in the wire feeding direction;
a controller comprising a first control unit configured to control a rotation speed of the first feeding motor based on a first speed command and a second control unit configured to control a rotation speed of the second feeding motor based on a second speed command,
a power supply configured to supply power to the second feeder and the second control unit,
wherein the controller changes the second speed command over time when an amount of change of the second speed command is not within a predetermined range;
wherein the controller changes the first speed command in conjunction with the second speed command when the controller changes the second speed command over time.

2. The wire feeding system according to claim 1, wherein the amount of change of the second speed command is a negative value, and the controller decreases the second speed command over time.

3. The wire feeding system according to claim 1, wherein the first feeder includes a first feeding roll that is rotated by the first feeding motor to feed the wire, and the second feeder includes a second feeding roll that is rotated by the second feeding motor to feed the wire, and
wherein the controller, when changing the second speed command over time, changes the first speed command and the second speed command so that a surface speed of the second feeding roll becomes faster than a surface speed of the first feeding roll.

4. The wire feeding system according to claim 1, further comprising:
a switching unit in communication with the second feeding motor;
a switch control unit that controls switching of the switching unit based on the second speed command and the rotation speed of the second feeding motor; and
the power supply is connected to and supplies power to the switching unit and the switching control unit.

5. A welding system comprising:
a welding torch;
a welding power-supply apparatus that supplies power to the welding torch; and
a wire feeding system set forth in claim 1, the wire feeding system feeding the wire to the welding torch.

6. The welding system according to claim 5, further comprising a detector that detects an arc break, wherein when an arc break is detected, the controller changes the second speed command to have a value corresponding to a slowdown feeding speed.

7. The welding system according to claim 5, further comprising a welding condition switch operation unit operatively connected to the controller.

8. A wire feeding system comprising:
a first feeder provided with a first feeding motor that feeds a wire in a wire feeding direction;
a second feeder spaced apart from the first feeder in the wire feeding direction and provided with a second feeding motor that feeds the wire in the wire feeding direction; and
a controller operatively connected to the first feeder and to the second feeder and that controls a rotation speed of the first feeding motor based on a first speed command and controls a rotation speed of the second feeding motor based on a second speed command, wherein the controller changes the second speed command over time in stages or linearly when an amount of change of the second speed command is not within a predetermined range;

wherein the controller changes the first speed command in conjunction with the second speed command when the controller changes the second speed command.

9. The wire feeding system according to claim 8, wherein the amount of change of the second speed command is a negative value, and the controller decreases the second speed command.

10. The wire feeding system according to claim 8, wherein the first feeder includes a first feeding roll that is rotated by the first feeding motor to feed the wire, and the second feeder includes a second feeding roll that is rotated by the second feeding motor to feed the wire, and wherein the controller, when changing the second speed command, changes the first speed command and the second speed command so that a surface speed of the second feeding roll becomes faster than a surface speed of the first feeding roll.

11. The wire feeding system according to claim 8, further comprising:

a switching unit in communication with the second feeding motor;

a switch control unit that controls switching of the switching unit based on the second speed command and the rotation speed of the second feeding motor; and a power supply that supplies power to the switching unit and the switching control unit.

12. A welding system comprising:

a welding torch;

a welding power-supply apparatus that supplies power to the welding torch; and a wire feeding system set forth in claim 9, the wire feeding system feeding the wire to the welding torch.

13. The welding system according to claim 12, further comprising a detector that detects an arc break, wherein when an arc break is detected, the controller changes the second speed command to have a value corresponding to a slowdown feeding speed.

14. The welding system according to claim 12, further comprising a welding condition switch operation unit operatively connected to the controller.

* * * * *